United States Patent
Rouzes

(10) Patent No.: US 10,795,158 B2
(45) Date of Patent: Oct. 6, 2020

(54) METHOD FOR DUAL HARMONIZATION OF A DDP POSTURE-DETECTING SUBSYSTEM INTEGRATED INTO A WORN/BORNE HEAD-UP VIEWING SYSTEM

(71) Applicant: THALES, Courbevoie (FR)

(72) Inventor: Siegfried Rouzes, Merignac (FR)

(73) Assignee: THALES, Courbevoie (FR)

(*) Notice: Subject to any disclaimer, the term of this patent is extended or adjusted under 35 U.S.C. 154(b) by 63 days.

(21) Appl. No.: 16/197,276

(22) Filed: Nov. 20, 2018

(65) Prior Publication Data

US 2019/0196190 A1 Jun. 27, 2019

(30) Foreign Application Priority Data

Dec. 21, 2017 (FR) .................................... 17 01343

(51) Int. Cl.
*G02B 27/01* (2006.01)
*G06F 3/01* (2006.01)
(Continued)

(52) U.S. Cl.
CPC ............ *G02B 27/017* (2013.01); *B60K 35/00* (2013.01); *G02B 27/0093* (2013.01);
(Continued)

(58) Field of Classification Search
CPC .. G02B 27/017; G02B 27/0179; G02B 27/01; G02B 27/0093; G02B 2027/0187;
(Continued)

(56) References Cited

U.S. PATENT DOCUMENTS

| 9,891,705 B1* | 2/2018 | Lahr | G06F 3/012 |
|---|---|---|---|
| 2019/0041979 A1* | 2/2019 | Kirchner | G01P 15/08 |
| 2019/0235241 A1* | 8/2019 | Suzuki | B60K 35/00 |

FOREIGN PATENT DOCUMENTS

EP 2 703 928 A1 3/2014

OTHER PUBLICATIONS

Foxlin et al., Improved Registration for Vehicular AR using Auto-Harmonization, pp. 105-112 (Year: 2014).*

(Continued)

*Primary Examiner* — Roberto W Flores
(74) *Attorney, Agent, or Firm* — Baker & Hostetler LLP

(57) ABSTRACT

A method for dual harmonization of a DDP posture-detecting subsystem integrated into a worn/borne head-up viewing system includes a first step of measurements of N rotation matrices $\hat{K}_i$ for detecting the posture of a head corresponding to a set of different targeting actions Vi, in which measurements one or more different preset elements of pilot/driver information displayed in the viewing device $D_v$ are superposed or aligned with one or more corresponding landmarks of the real outside world; then a second step of conjointly calculating the relative orientation matrix $\hat{R}(S1/v)$ of the DDP tracking first element S1 with respect to the viewing device $D_v$ and/or the relative orientation matrix $\hat{R}(ref/S2)$ of the external reference device $D_{Ref}$ with respect to the DDP fixed solid second element S2 to respectively be the right-side bias rotation matrix $\hat{D}$ and the left-side bias rotation matrix $\hat{G}$, which are solutions of the system of dual harmonization equations: $\hat{U}_i = \hat{G} \cdot \hat{K}_i \cdot \hat{D}$, i varying from 1 to N.

16 Claims, 6 Drawing Sheets

(51) Int. Cl.
- *B60K 35/00* (2006.01)
- *G02B 27/00* (2006.01)
- *G01C 23/00* (2006.01)

(52) U.S. Cl.
CPC .............. *G02B 27/01* (2013.01); *G06F 3/011* (2013.01); *G06F 3/012* (2013.01); *G06F 3/017* (2013.01); *B60K 2370/146* (2019.05); *G01C 23/00* (2013.01)

(58) Field of Classification Search
CPC ...... G02B 2027/014; G02B 2027/0138; B60K 35/00; B60K 2370/146; G01C 23/005; G01C 23/00; G06F 17/16; G06F 3/011; G06F 3/017; G06F 3/012
See application file for complete search history.

(56) References Cited

OTHER PUBLICATIONS

Foxlin et al., Design and Error Analysis of a Vehicular AR System with Auto-Harmonization, pp. 1323-1335 (Year: 2015).*

Tuceryan, et al., "Single point active alignment method (SPAAM) for optical see-through HMD calibration for AR", Proceedings IEEE and ACM International Symposium on Augmented Reality (ISAR 2000), pp. 149-158, Oct. 5, 2000.

Tuceryan, et al.,"Calibration requirements and procedures for a monitor-based augmented reality system", IEEE Transactions on Visualization and Computer Graphics, vol. 1, Issue: 3, pp. 255-273, Sep. 1, 1995.

Genc, et al., "Practical solutions for calibration of optical see-through devices", Proceedings, International Symposium on Mixed and Augmented Reality, p. 169, Sep. 30, 2002.

Grubert, et al., "A Survey of Calibration Methods for Optical See-Through Head-Mounted Displays", IEEE Transactions on Visualization and Computer Graphics, vol. 24, Issue: 9, Sep. 13, 2017.

* cited by examiner

METHOD FOR DUAL HARMONIZATION OF A DDP POSTURE-DETECTING SUBSYSTEM INTEGRATED INTO A WORN/BORNE HEAD-UP VIEWING SYSTEM

CROSS-REFERENCE TO RELATED APPLICATIONS

This application claims priority to foreign French patent application No. FR 1701343, filed on Dec. 21, 2017, the disclosure of which is incorporated by reference in its entirety.

FIELD OF THE INVENTION

The present invention relates to a method and subsystem for dual harmonization of a DDP (acronym of the French expression detection de posture) posture-detecting subsystem integrated into a worn/borne head-up viewing system.

BACKGROUND

The worn/borne head-up viewing system and posture-detecting subsystem are intended to be located on-board carrier vehicles that are able to move with respect to a reference coordinate system of a real outside world. These vehicles are in particular aircraft, military or civilian aeroplanes or military or civilian helicopters.

In any case, the purpose of the posture-detecting subsystem is to make available, to the pilot/driver or to the worn/borne head-up viewing system, the angular orientation or the relative rotation between a tracking mobile solid first element S1 that is associated with the head of the pilot, and a fixed solid second element S2 that is associated either with the coordinate system of the platform of the aircraft, or with the local geographic coordinate system, or with a terrestrial coordinate system.

Generally, a posture-detecting subsystem is configured to make available to the pilot/driver or to the piloting/driving system information on the relative three-dimensional 3D rotation between:

on the one hand a tracking mobile first element S1 of said DDP posture-detecting system, which element is solid and orientable with three angles of rotation, and has a first orthonormal coordinate system $R_{S1}$ that is tightly linked to a transparent viewing device $D_v$ allowing, simultaneously, pilot/driver information (images, symbols, instructions, reticles) to be displayed in a coordinate system $R_v$ called the viewing or targeting coordinate system, and observation of objects of a real outside world; and on the other hand a fixed second element S2 of said DDP posture-detecting subsystem, which element is solid, has a second orthonormal coordinate system $R_{S2}$ and is tightly linked to a reference device $D_{ref}$ having what is called a reference coordinate system, designated by $R_{ref}$, and able to be either a coordinate system of the carrier vehicle, or a local geographic coordinate system, or a terrestrial coordinate system.

By definition, a "tight" link between the orientable solid first element S1 of the DDP posture-detecting subsystem and the viewing and targeting device $D_v$ is a rigid link that ensures that the rotation matrix $\hat{R}(R_{S1}/R_v)$ allowing passage from the first orthonormal coordinate system $R_{S1}$, which is attached to the orientable tracking solid first element S1 of the posture-detecting subsystem, to the viewing and targeting coordinate system $R_v$ is a rotation matrix that is invariant in time.

By definition, a "tight" link between the solid second element S2 of the DDP posture-detecting subsystem and the fixed reference device $D_{ref}$ is a rigid link that ensures that the rotation matrix $\hat{R}(R_{S1}/R_v)$ allowing passage from the second orthonormal coordinate system $R_{S2}$, which is attached to the fixed solid second element S2 of the posture-detecting subsystem, to the fixed coordinate system $R_{ref}$ is a rotation matrix that is invariant in time.

Often, the fixed reference coordinate system $R_{ref}$ is the coordinate system in which the coordinates of objects that it is desired to observe in the viewing and aligning coordinate system $R_v$ associated with the viewing and targeting system are known. The DDP posture-detecting subsystem then allows real or virtual objects to be "projected" from the reference coordinate system into the viewing coordinate system. In particular, if this system is transparent, it is possible to superpose the projected objects on their real image, conformal projection then being spoken of.

In any case, the useful output information $DDP_{useful}$ that it is sought to deliver to the pilot/driver or to the piloting/driving device, i.e. the rotation between the coordinate system $R_v$ of the sight of the helmet/headset of the pilot/driver and the reference coordinate system $R_{ref}$ is different from the raw output $DDP_{raw}$ calculated by the DDP posture-detecting system, i.e. the measured and calculated rotation matrix between a first orthonormal coordinate system $R_{S1}$, which is tightly linked to the pointing and viewing coordinate system $R_v$, and a second orthonormal coordinate system $R_{S2}$, which is tightly linked to the reference coordinate system $R_{ref}$.

Generally, the rotation $DDP_{raw}$ calculated by way of its matrix by the posture-detecting system is inexact, i.e. different from the actual rotation between the coordinate system $R_v$ of the sight of the helmet/headset of the pilot/driver and the reference coordinate system $R_{ref}$, this rotation also being called the useful output rotation $DDP_{useful}$.

The calculated raw output rotation $DDP_{raw}$ calculated by the DDP posture-detecting system is inexact in particular for the following reasons, which are not exclusive from one another, more than one possibly being applicable:

the raw output $DDP_{raw}$ calculated by the DDP posture-detecting system, which expresses the rotation between a first coordinate system $R_{S1}$ of the orientable first element S1 of the DDP and a second coordinate system $R_{S2}$ of the solid second element S2 of the DDP is different from the useful output rotation $DDP_{useful}$ between the desired coordinate system $R_v$ of the sight of the helmet/headset of the pilot/driver or of the pointing device;

the calculated raw output $DDP_{raw}$ is only partially defined, one or more of its matrix components being missing;

the calculated raw output $DDP_{raw}$ has been altered by the appearance of a bias or offset, for example following a shock or ageing or a poorly aligned installation.

At the present time, to make the calculated raw output $DDP_{raw}$ more exact, it is known to carry out correctional alignments, but these correctional alignments are partial and work only for a single bias, or a single identified unknown, and provided that only this one bias defect exists.

In addition, when a posture detection error is observed, for example by observing a nonconformity, it is difficult, or even impossible, depending on the circumstances, to identify the error and to correct the calculated raw output $DDP_{raw}$, because of the fact that the posture detection defect expresses itself locally by a double possible alteration of the calculated raw output matrix $DDP_{raw}$, i.e. one to the left by a left rotation matrix denoted $\hat{G}$, and one to the right by a right rotation matrix denoted $\hat{D}$, the rotation matrices $DDP_{useful}$, $DDP_{raw}$, $\hat{G}$ and $\hat{D}$ being related by the following relationship:

$$DDP_{useful} = \hat{G} \cdot DDP_{raw} \cdot \hat{D}$$

in which the useful output matrix $DDP_{useful}$, the raw output matrix $DDP_{raw}$, the left rotation matrix $\hat{G}$, and the right rotation matrix $\hat{D}$ respectively satisfy the following relationships:

$$DDP_{useful} = \hat{R}(R_{ref}/R_v)$$

$$DDP_{raw} = \hat{R}(R_{S2}/R_{S1})$$

$$\hat{G} = \hat{R}(R_{ref}/R_{S2})$$

$$\hat{D} = \hat{R}(R_{S1}/R_v).$$

At the present time, proposed solutions for harmonizing the raw output matrix $DDP_{raw}$ consist of complex algorithms that include at least two steps, each step corresponding to a partial harmonization of a limited number of components of the raw output matrix, the remaining components, which are not harmonized, needing to be perfectly known as otherwise residual defects alter the result of the harmonization in progress. Thus, it is not possible to achieve a dual optimization of defects. In other words, the harmonization methods proposed and carried out at present are complex methods that separately determine the two, left and right, rotation matrices $\hat{G}$ and $\hat{D}$, and therefore that do not allow a dual optimization of defects.

Moreover, current-day harmonization methods make excessive use of trigonometry functions, which are sources of imprecision and multiple errors, and which are not needed to harmonize a raw output of a posture-detecting system.

SUMMARY OF THE INVENTION

The technical problem that the invention solves is that of remedying the aforementioned drawbacks and of providing a method for dual harmonization of the raw output rotation measured and calculated by a posture-detecting system that determines, in a global way, i.e., at the same time, the left and right rotation matrices $\hat{G}$ and $\hat{D}$.

Particularly, the technical problem is to provide a method for global harmonization of the raw output rotation matrix measured and calculated by a posture-detecting system, which implements a single set of measurement stations without knowledge of sources of alteration.

The provided solution allows, with a single set of measurements, the useful DDP output to be calculated whether the origin of the alterations is known in advance or not.

To this end, one subject of the invention is a method for dual harmonization of a DDP posture-detecting subsystem integrated into a worn/borne head-up viewing system, the worn/borne head-up viewing system being located on-board a carrier vehicle and comprising: a transparent worn/borne head-up viewing device $D_v$, an exterior reference device $D_{ref}$ having an exterior reference coordinate system $R_{ref}$ possibly either a coordinate system of the carrier vehicle or a local geographic coordinate system or a terrestrial coordinate system; a DDP posture-detecting subsystem comprising a tracking solid first element S1 rigidly and tightly attached to the viewing device $D_v$, a fixed solid second element S2 tightly joined to the reference device $D_{ref}$, and a means for measuring and determining the relative orientation $\hat{K}$ of the tracking mobile first element S1 with respect to the fixed second element S2; a dual harmonization subsystem for harmonizing the worn/borne head-up viewing system and the DDP posture-detecting subsystem.

The dual harmonization method is characterized in that it comprises steps consisting in:

in a first step, a series of a preset number N of measurements of relative orientations $\hat{K}_i$, i varying from 1 to N, of the tracking mobile first element S1 with respect to the fixed second element S2 of the DDP posture-detecting subsystem, corresponding to different targeting actions Vi, i varying from 1 to N, are carried out, in which measurements one or more different preset elements of pilot/driver information displayed in the viewing device $D_v$ are superposed or aligned with one or more corresponding landmarks of the real outside world the theoretical rotation matrices $\hat{U}_i$ of which in the exterior reference coordinate system are known; then in a second step, and using a dual harmonization algorithm, conjointly calculating the relative orientation matrix $\hat{R}(S1/v)$ of the tracking first element S1 of the posture-detecting subsystem with respect to the viewing device $D_v$, and/or the relative orientation matrix $\hat{R}(ref/S2)$ of the external reference device $D_{Ref}$ with respect to the fixed solid second element S2 of the posture-detecting subsystem to respectively be the right-side bias rotation matrix $\hat{D}$ and the left-side bias rotation matrix $\hat{G}$, which are conjoint solutions of the system of dual harmonization equations: $\hat{U}_i = \hat{G} \cdot \hat{K}_i \cdot \hat{D}$, i varying from 1 to N.

According to particular embodiments, the method for dual harmonization of a DDP posture-detecting subsystem includes one or more of the following features implemented alone or in combination:

the minimum required number N of measurements depends on the number L of erroneous or inexploitable degrees of angular freedom of the rotation matrices $\hat{R}(S1/v)$ and $R(ref/S2)$ of the head-up viewing system, said number L being an integer higher than or equal to 1 and lower than or equal to 6, and the solution of the system of equations $\hat{U}_i = \hat{G} \cdot \hat{K}_i \cdot \hat{D}$, i varying from 1 to N, uses a rectification operator $\pi(.)$ that converts any given matrix A into a 3×3 square rotation matrix $\pi(A)$, which matrix $\pi(A)$, of all the 3×3 rotation matrices, is the closest in the least-squares sense to all of the terms of the matrix $\pi(A)-A$, to determine the right-side rotation $\hat{D}$ and the left-side rotation $\hat{G}$;

in a first configuration, the number of erroneous or inexploitable degrees of angular freedom of the right-side bias rotation matrix $\hat{D}$ is equal to three and the number of erroneous or inexploitable degrees of angular freedom of the left-side bias rotation matrix $\hat{G}$ is equal to three, the first step carries out a number N higher than or equal to 3 of measurements, for which measurements the targeting actions Vi correspond to an alignment of displayed three-dimensional reference marks with observed exterior three-dimensional reference marks, and the second step of solving the system of dual harmonization equations comprises a first set of substeps consisting in: in a first substep, choosing a "pivot" measurement as the first measurement among the N measurements, this pivot measurement corresponding to i equal to 1, and for i=2, N the rotation matrices $\hat{U}_{1,i}$ and $\hat{K}_{1,i}$ are calculated using the equations: $\hat{U}_{1,i} = \hat{U}_1^T \cdot \hat{U}_i$ and $\hat{K}_{1,i} = \hat{K}_1^T \cdot \hat{K}_i$; then in a second substep, determining for i=2, ..., N the principle unit vectors of the rotations $\hat{U}_{1,i}$ and $\hat{K}_{1,i}$, designated by $\vec{u}_i$ and $\vec{k}_i$, respectively; then in a third substep, calculating the right matrix $\hat{D}$ using the equation: $\hat{D} = \pi(\Sigma_{i \geq 2}(\vec{k}_i \cdot \vec{u}_i^T))$; then in a fourth substep, determining the left-side rotation matrix $\hat{G}$ on the basis of the matrix $\hat{D}$ calculated in the third substep, using the equation:

$$\hat{G} = \pi\left(\sum_{i\geq 1}(\hat{U}_i \cdot \hat{D}^T \cdot \hat{K}_i^T)\right)$$

in a second configuration, the number of erroneous or inexploitable degrees of angular freedom of the right-side bias rotation matrix $\hat{D}$ is equal to three and the single erroneous or inexploitable degree of angular freedom of the left-side bias rotation matrix $\hat{G}$ is the azimuth angle, the elevation and roll angles being assumed to be known with a sufficient precision; the first step carries out a number N higher than or equal to 4 of measurements, for which measurements the targeting actions Vi correspond to an alignment of displayed three-dimensional reference marks with observed three-dimensional reference marks; and the second step of solving the system of dual harmonization equations comprises a second set of substeps consisting in: in a fourth substep for $i=2, \ldots, N$, calculating the matrices $\hat{U}_{1,i}$ and the vectors $\vec{q}_i$ using the equations: $\hat{U}_{1,i} = \hat{U}_1^T \cdot \hat{U}_i$ and $\vec{q}_i = \hat{Q}_i^T \cdot \vec{k}$, the vector $\vec{k}$ being defined by the equation $$\vec{k} = \begin{pmatrix} 0 \\ 0 \\ 1 \end{pmatrix};$$

then in an initialization fifth substep, initializing a first sequence of matrices $\{\hat{D}_{[s]}\}$, [s] designating the current integer rank of advancement through the sequence $\{\hat{D}_{[s]}\}$, by setting $\hat{D}_{[0]}$ equal to $I_3$, $I_3$ being the identity matrix; then repeating an iterative sixth substep in which iteration [s+1] is passed to from iteration [s] by calculating the vector value $\vec{d}_{[s+1]}$, then the value $\hat{D}_{[s+1]}$ of the first matrix sequence $\{\hat{D}_{[s]}\}$, using the following equations:

$$\vec{d}_{[s+1]} = \frac{\sum_{i\geq 2}(\hat{U}_{1,i} \cdot \hat{D}_{[s]}^T \cdot \vec{q}_i)}{\left\|\sum_{i\geq 2}(\hat{U}_{1,i} \cdot \hat{D}^T \cdot \vec{q}_i)\right\|}$$

$$\hat{D}_{[s+1]} = \pi\left(\sum_{i\geq 2}(\vec{q}_i \cdot \vec{d}_{[s+1]}^T \cdot \hat{U}_{1,i})\right)$$

the sequence $\{\vec{d}_{[s]}\}$ being an auxiliary second sequence of vectors and the sequence $\{\hat{D}_{[s]}\}$ converging to $\hat{D}$; and stopping in a seventh substep the iterative process carried out throughout the sixth substep when the limit $\hat{D}$ is approximated with a sufficient precision defined by a preset threshold value;

in a third configuration, the number of erroneous or inexploitable degrees of angular freedom of the right-side bias rotation matrix $\hat{D}$ is equal to three and the number of erroneous or inexploitable degrees of angular freedom of the left-side bias rotation matrix $\hat{G}$ is equal to three; and the first step carries out a number N higher than or equal to 4 of measurements, for which measurements the targeting actions Vi correspond to an alignment of a plurality of different targeting directions $\vec{x}_i$ with a plurality of targeted exterior directions $\vec{y}_i$ that are known in the reference exterior coordinate system $R_{Ref}$, without roll adjustment, the vector families $\{\vec{x}_i\}$ and $\{\vec{y}_i\}$ both being free; and the second step of solving the system of dual harmonization equations: $\vec{y}_i = \hat{G} \cdot \hat{K}_i \cdot \hat{D} \cdot \vec{x}_i$ for i varying from 1 to N comprises a third set of the following substeps consisting in: in an initialization eighth substep, initializing a first sequence of left matrices $\{\hat{G}_{[s]}\}$, [s] designating the integer rank of advancement through this first sequence, by setting $\hat{G}_{[0]}$ equal to $I_3$, $I_3$ being the identity matrix; then repeating an iterative ninth substep in which iteration [s+1] is passed to from iteration [s] by calculating the matrix $\hat{D}_{[s+1]}$ then the matrix $\hat{G}_{[s+1]}$ using the following equations:

$$\hat{D}_{[s+1]} = \pi\left(\sum_{i\geq 1}(\hat{K}_i^T \cdot \hat{G}_{[s]}^T \cdot \vec{y}_i \cdot \vec{x}_i^T)\right)$$

$$\hat{G}_{[s+1]} = \pi\left(\sum_{i\geq 1}(\vec{y}_i \cdot \vec{x}_i^T \cdot \hat{D}_{[s+1]}^T \cdot \hat{K}_i^T)\right)$$

the sequence $\{\hat{D}_{[s]}\}$ being a second sequence of right matrices, and the sequences $\hat{D}_{[s]}$ and $\hat{G}_{[s]}$ converging to $\hat{D}$ and $\hat{G}$, respectively; and stopping in a stopping tenth substep the iterative process executed throughout the ninth substep when the limits $\hat{D}$ and $\hat{G}$ are approximated with a sufficient precision;

in a fourth configuration, the number of erroneous or inexploitable degrees of angular freedom of the right-side bias rotation matrix $\hat{D}$ is equal to three and the left-side bias rotation matrix $\hat{G}$ is assumed known; and the first step carries out a number N higher than or equal to 3 of measurements, for which measurements the targeting actions Vi correspond to an alignment of N different targeting directions $\vec{x}_i$ with one and the same targeted exterior direction $\vec{y}_0$, which targeted direction is known in the reference exterior coordinate system $R_{Ref}$, without roll adjustment, the vector family $\{\vec{x}_i\}$ being free; and the second step of solving the system of dual harmonization equations: $\hat{G} \cdot \hat{K}_i \cdot \hat{D} \cdot \vec{x}_i = \vec{y}_0$ for i varying from 1 to N determines the right bias rotation matrix $\hat{D}$ via the following equation:

$$\hat{D} = \pi(\Sigma_{i\geq 1}(\hat{K}_i^T \cdot \hat{G}^T \cdot \vec{y}_0 \cdot \vec{x}_i^T));$$

in a fifth configuration, the number of erroneous or inexploitable degrees of angular freedom of the right-side bias rotation matrix $\hat{D}$ is equal to three and the left-side bias rotation matrix $\hat{G}$ is assumed to be known; and the first step carries out a number N higher than or equal to 4 of measurements, for which measurements the targeting actions Vi correspond to an alignment of N different targeting directions $\vec{x}_i$ with one and the same unknown targeted exterior direction $\vec{y}_0$, without roll adjustment, the vector family $\{\vec{x}_i\}$ being free; and the second step of solving the system of dual harmonization equations: $\hat{G} \cdot \hat{K}_i \cdot \hat{D} \cdot \vec{x}_i = \vec{y}_0$ for i varying from 1 to N comprises a fifth set of substeps consisting in: in an initialization eleventh substep, initializing a first sequence of right matrices $\{\hat{D}_{[s]}\}$, [s] designating the integer rank of advancement through the sequence $\{\hat{D}_{[s]}\}$, by setting $\hat{D}_{[0]}$ equal to $I_3$, $I_3$ being the identity matrix; then repeating an iterative twelfth substep in which iteration [s+1] is passed to from iteration [s] by calculating the vector $\vec{y}_{[s+1]}$ then the matrix $\hat{D}_{[s+1]}$ using the following equations:

$$\vec{y}_{[s+1]} = \frac{\sum_{i \geq 1} (\hat{G} \cdot \hat{K}_i \cdot \hat{D}_{[s]} \cdot \vec{x}_i)}{\|\sum_{i \geq 1} (\hat{G} \cdot \hat{K}_i \cdot \hat{D}_{[s]} \cdot \vec{x}_i)\|}$$

$$\hat{D}_{[s+1]} = \pi \left( \sum_{i \geq 1} (\hat{K}_i^T \cdot \hat{G}^T \cdot \vec{y}_{[s+1]} \cdot \vec{x}_i^T) \right)$$

the sequence $\{\vec{y}_{[s]}\}$ being a second sequence of external direction vectors, and the sequences $\{\vec{y}_{[s]}\}$ and $\{\hat{D}_{[s]}\}$ converging to $\vec{y}_0$ and $\hat{D}$, respectively; and stopping in a stopping thirteenth substep the iterative process carried out throughout the twelfth substep when the limits $\vec{y}_0$ and $\hat{D}$ are approximated with a sufficient precision defined by one or two preset threshold values;

in a sixth configuration, the number of erroneous or inexploitable degrees of angular freedom of the right-side bias rotation matrix $\hat{D}$ is equal to three and the left-side bias rotation matrix $\hat{G}$ is unknown and indeterminable; and the first step carries out a number N higher than or equal to 4 of measurements, for which measurements the targeting actions Vi correspond to an alignment of N different targeting directions $\vec{x}_i$ with one and the same unknown targeted exterior direction $\vec{y}_0$, without roll adjustment, the vector family $\{\vec{x}_i\}$ being free, and reduces the solution of the system of dual harmonization equations: $\hat{G} \cdot \hat{K}_i \cdot \hat{D} \cdot \vec{x}_i = \vec{y}_0$ for i varying from 1 to N to the solution of the reduced system of dual harmonization equations: $\hat{K}_i \cdot \hat{D} \cdot \vec{x}_i = \vec{z}_0$ for i varying from 1 to 4, noting $\vec{z}_0 = \hat{G}^T \cdot \vec{y}_0$; and the second step of solving the reduced system of dual harmonization equations comprises a sixth set of substeps consisting in: in an initialization fourteenth substep, initializing a first sequence of right matrices $\{\hat{D}_{[s]}\}$, [s] designating the integer rank of advancement through the sequence $\{\hat{D}_{[s]}\}$, by setting $\hat{D}_{[0]}$ equal to $I_3$, $I_3$ being the identity matrix; then repeating an iterative fifteenth substep in which iteration [s+1] is passed to from iteration [s] by calculating the vector $\vec{z}_{[s+1]}$ then the matrix $\hat{D}_{[s+1]}$ of the first matrix sequence using the following equations:

$$\vec{z}_{[s+1]} = \frac{\sum_{i \geq 1} (\hat{K}_i \cdot \hat{D}_{[s]} \cdot \vec{x}_i)}{\|\sum_{i \geq 1} (\hat{K}_i \cdot \hat{D}_{[s]} \cdot \vec{x}_i)\|}$$

$$\hat{D}_{[s+1]} = \pi \left( \sum_{i \geq 1} (\hat{K}_i^T \cdot \vec{z}_{[s+1]} \cdot \vec{x}_i^T) \right)$$

the sequence $\{\vec{z}_{[s]}\}$ being a second auxiliary sequence of vectors and the sequence $\{\hat{D}_{[s]}\}$ converging to $\hat{D}$; and stopping in a stopping sixteenth substep the iterative process carried out throughout the fifteenth substep when the limit $\hat{D}$ is approximated with a sufficient precision defined by a preset threshold value;

In a seventh configuration, the number of erroneous or inexploitable degrees of angular freedom of the left-side bias rotation matrix $\hat{G}$ is equal to three and the right-side bias rotation matrix $\hat{D}$ is assumed to be known; and the first step carries out a number N higher than or equal to 3 of measurements, for which measurements the targeting actions Vi correspond to an alignment of one and the same known targeting direction $\vec{x}_0$ with N known targeted exterior directions $\vec{y}_i$, without roll adjustment, the vector family $\{\vec{y}_i\}$ being free, and the second step of solving the system of dual harmonization equations: $\hat{G} \cdot \hat{K}_i \cdot \hat{D} \cdot \vec{x}_0 = \vec{y}_i$ for i varying from 1 to N determines the sought left rotation matrix $\hat{G}$ using the equation: $\hat{G} = \pi(\Sigma_{i \geq 1} (\vec{y}_i \cdot \vec{x}_0^T \cdot \hat{D}^T \cdot \hat{K}_i^T))$;

in an eighth configuration, the number of erroneous or inexploitable degrees of angular freedom of the left-side bias rotation matrix $\hat{G}$ is equal to three and the right-side bias rotation matrix $\hat{D}$ is assumed to be known; and the first step carries out a number N higher than or equal to 4 of measurements, for which measurements the targeting actions Vi correspond to an alignment of one and the same unknown targeting direction $\vec{x}_0$ with N known targeted exterior directions $\vec{y}_i$, without roll adjustment, the vector family $\{\vec{y}_i\}$ being free; and the second step of solving the system of dual harmonization equations: $\hat{G} \cdot \hat{K}_i \cdot \hat{D} \cdot \vec{x}_0 = \vec{y}_i$ for i varying from 1 to N comprises an eighth set of substeps consisting in: in a seventeenth substep, initializing a first sequence of left matrices $\{\hat{G}_{[s]}\}$, [s] designating the integer rank of advancement through the sequence $\{\hat{G}_{[s]}\}$, $\hat{G}_{[0]}$ being initialized set equal to $I_3$, $I_3$ being the identity matrix; then repeating an iterative eighteenth substep in which iteration [s+1] is passed to from iteration [s] by calculating the vector $\vec{x}_{[s+1]}$ then the matrix $\hat{G}_{[s+1]}$ using the following equations:

$$\vec{x}_{[s+1]} = \frac{\sum_{i \geq 1} (\hat{D}^T \cdot \hat{K}_i^T \cdot \hat{G}_{[s]}^T \cdot \vec{y}_i)}{\|\sum_{i \geq 1} (\hat{D}^T \cdot \hat{K}_i^T \cdot \hat{G}_{[s]}^T \cdot \vec{y}_i)\|}$$

$$\hat{G}_{[s+1]} = \pi \left( \sum_{i \geq 1} (\vec{y}_i \cdot \vec{x}_{[s+1]}^T \cdot \hat{D}^T \cdot \hat{K}_i^T) \right)$$

the sequence $\{\vec{x}_{[s]}\}$ being a second sequence of targeting direction vectors, the sequences $\hat{G}_{[s]}$ and $\vec{x}_{[s]}$ converging to $\hat{G}$ and $\vec{x}_0$, respectively; and in a stopping nineteenth substep stopping the iterative process carried out throughout the eighteenth substep when the limits $\hat{G}$ and optionally $\vec{x}_0$ are approximated with a sufficient precision defined by one or two preset threshold values;

the head-up viewing system is intended to be located on-board a carrier vehicle comprised in the set of all aircraft, aeroplanes, helicopters, motor vehicles and robots.

Another subject of the invention is a worn/borne head-up viewing system located on-board a carrier vehicle and comprising: a transparent worn/borne head-up viewing device $D_v$, a reference device $D_{ref}$ having a reference coordinate system $R_{ref}$, possibly either a coordinate system of the carrier vehicle or a local geographic coordinate system or a terrestrial coordinate system; a DDP posture-detecting subsystem comprising a tracking solid first element S1 rigidly and tightly attached to the viewing device $D_v$, a fixed solid second element S2 tightly joined to the reference device $D_{ref}$, and a means for measuring and determining the relative orientation $\hat{K}$ of the tracking mobile first element S1 with respect to the fixed second element S2; a dual harmonization subsystem for harmonizing the head-up viewing system and the DDP posture-detecting subsystem, the dual harmonization subsystem comprising a dual harmonization processor and an HMI interface for managing the acquisitions of the harmonization measurements.

The worn/borne head-up viewing system is characterized in that the dual harmonization subsystem and the DDP posture-detecting subsystem are configured to:

in a first step, carry out a series of a preset number N of measurements of relative orientations $\hat{K}_i$, i varying from 1 to N, of the tracking mobile first element S1 with respect to the fixed second element S2 of the DDP posture-detecting subsystem, corresponding to different targeting actions Vi, i varying from 1 to N, in which measurements one or more different preset elements of pilot/driver information displayed in the viewing device $D_v$ are superposed or aligned with one or more corresponding landmarks of the real outside world; then in a second step, and using a dual harmonization algorithm, conjointly calculate the relative orientation matrix $\hat{R}(S1/v)$ of the tracking first element S1 of the posture-detecting subsystem with respect to the viewing device $D_v$ and/or the relative orientation matrix $\hat{R}(ref/S2)$ of the external reference device $D_{Ref}$ with respect to the fixed solid second element S2 of the posture-detecting subsystem to respectively be the right-side bias rotation matrix $\hat{D}$ and the left-side bias rotation matrix $\hat{G}$, which are conjoint solutions of the system of dual harmonization equations: $\hat{U}_i = \hat{G} \cdot \hat{K}_i \cdot \hat{D}$, i varying from 1 to N.

According to particular embodiments, the head-up viewing system includes one or more of the following features implemented alone or in combination:

the minimum required number N of measurements depends on the number L of erroneous or inexploitable degrees of angular freedom of the rotation matrices $\hat{R}(S1/v)$ and $\hat{R}(ref/S2)$ of the head-up viewing system, said number L being an integer higher than or equal to 1 and lower than or equal to 6, and the solution of the system of equations $\hat{U}_i = \hat{G} \cdot \hat{K}_i \cdot \hat{D}$, i varying from 1 to N, uses a rectification operator $\pi(.)$ that converts any given matrix A into a 3×3 square rotation matrix $\pi(A)$, which matrix $\pi(A)$, of all the 3×3 rotation matrices, is the closest in the least-squares sense to all of the terms of the matrix $\pi(A)-A$, to determine the right-side rotation $\hat{D}$ and the left-side rotation $\hat{G}$.

the dual harmonization subsystem and the DDP posture-detecting subsystem are configured to implement the first and second steps such as defined above.

Another subject of the invention is a carrier vehicle, comprised in the set of all aircraft, aeroplanes, helicopters, motor vehicles and robots, and in which is installed a worn/borne head-up viewing system such as defined above.

BRIEF DESCRIPTION OF THE DRAWINGS

The invention will be better understood on reading the following description of a plurality of embodiments, which is given merely by way of example and which makes reference to the drawings, in which.

DETAILED DESCRIPTION

Figure 1:
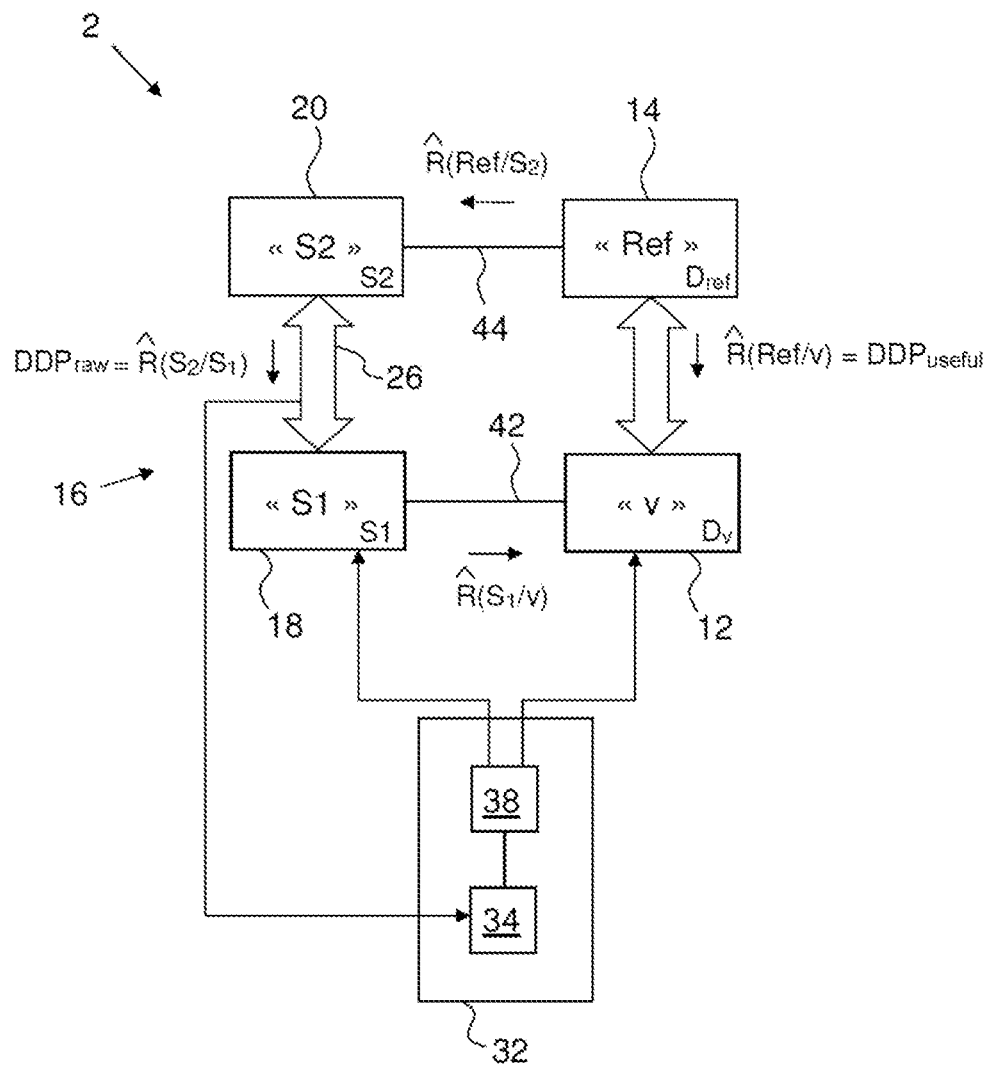
FIG. 1 is a general view of a worn head-up viewing system according to the invention allowing dual harmonization of the posture-detecting subsystem that is a constituent of said head-up viewing system.

According to FIG. 1, a head-up viewing system 2 according to the invention, which system is intended to be located on-board a mobile carrier vehicle, for example an aircraft, comprises the following devices and means:

a transparent worn head-up viewing or displaying device 12, a lens for example, designated by $D_v$, that is positioned in front of the eye of a pilot and able to serve him as a sight;

a reference device 14, designated by $D_{ref}$, having a reference coordinate system, designated by $R_{ref}$, which may be either a coordinate system of the carrier vehicle, or a local geographic coordinate system, or a terrestrial coordinate system;

a DDP posture-detecting subsystem 16 comprising:

a tracking angularly mobile solid first element 18 S1, which is rigidly attached to the head or helmet of the pilot, and tightly or rigidly attached to the viewing device 12 $D_v$, a fixed solid second element 20 S2, which is tightly linked to the reference device 14 $D_{ref}$, and a means 26 for measuring and determining the relative orientation $\hat{R}(R_{S2}/R_{S1})$ of the tracking mobile first element 18 S1 with respect to the fixed second element 22 S2, which is tightly linked to the reference device 14 $D_{ref}$, the relative orientation also being denoted $\hat{R}(R_{S2}/R_{S1})$, a dual harmonization subsystem 32 for harmonizing the components of the head-up viewing system 2 and the DDP posture-detecting subsystem 16, the dual harmonization subsystem 32 comprising a dual harmonization processor 34 and a human-system interface 38, which is configured to perform and manage interfacing operations between the operator or the pilot and the components of the head-up viewing system 2 during the implementation of the dual harmonization method according to the invention.

Below, a coordinate system denoted "$R_i$" will, for the sake of simplicity, be denoted "i".

Below, the rotation-matrix notation "$\hat{R}(R_i/R_j)$" will be simplified to the notation "$\hat{R}(i/j)$". Thus, for example, the matrix $\hat{R}(R_{S2}/R_{S1})$ will be more simply denoted the matrix $\hat{R}(S2/S1)$.

Below, the means allowing the relative orientation of a coordinate system "i" with respect to another "j" to be known are considered equivalent in the rest of this document to the matrix describing this orientation. Specifically, the orientation $\hat{R}(i/j)$ of a coordinate system "i" with respect to another "j" may be described either by:

three what are called Euler angles, which conventionally, in aeronautics, correspond to the order of the rotations for the following angles:

Azimuth: rotation about the z-axis, which is oriented downward (or toward the Earth);

Elevation: rotation about the y-axis, which is oriented toward the right (or toward the east of the Earth);

Roll: rotation about the x-axis, which is oriented frontward (or toward the north of the Earth), or a 3×3 matrix describing this rotation.

The matrix $\hat{R}(i/j)$ describing the relative orientation of the coordinate system "i" with respect to "j" (or from "i" to "j") allows the expression vi of a vector in the coordinate system "i" to be related to the expression vj of the same vector in the coordinate system "j" by the relationship: vi=M(i/j)*vj and the relationship of passage between the coordinate systems "i", "j", and "k" is written: $\hat{R}(i/k)=\hat{R}(j/k)*\hat{R}(i/j)$.

The tight link between the tracking mobile solid first element S1 18 of the DDP posture-detecting subsystem 16 and the targeting and viewing device 12 $D_v$ is a first link 42 that is assumed to be rigid, and which ensures that the rotation matrix $\hat{R}(S1/v)$ allowing the passage from the first orthonormal coordinate system $R_{S1}$ attached to the orientable solid first element S1 of the DDP posture-detecting subsystem 16 to the targeting and viewing coordinate system $R_v$ is a rotation matrix that is invariant in time.

The tight link between the solid second element 20 S2 of the DDP posture-detecting subsystem 16 and the fixed reference device 14 $D_{ref}$ is a second rigid link that ensures that the rotation matrix $\hat{R}(Ref/S2)$ allowing the passage from the fixed coordinate system $R_{ref}$ to the second orthonormal coordinate system $R_{S2}$ attached to the fixed solid second element S2 of the DDP posture-detecting subsystem 16 is a rotation matrix that is invariant in time.

Generally, the fixed reference coordinate system $R_{ref}$ is the coordinate system in which the coordinates of objects that it is desired to observe in the viewing and aligning coordinate system $R_v$ linked to the viewing and targeting device 12 $D_v$ are known. The DDP posture-detecting subsystem 16 then allows the real or virtual objects of the reference coordinate system to be "projected" into the viewing coordinate system. In particular, if the viewing device 12 $D_v$ is transparent, it is possible to superpose the projected objects on their real image, conformal projection then being spoken of.

In any case, the useful output information $DDP_{useful}$ that it is sought to deliver to the pilot or to the piloting device, i.e. the rotation between the coordinate system $R_v$ of the sight of the helmet of the pilot and the reference coordinate system $R_{ref}$ is different from the raw output $DDP_{raw}$ calculated by the DDP posture-detecting system, i.e. the measured and calculated rotation matrix between the first orthonormal coordinate system $R_{S1}$, which is tightly linked via the first link 42 to the targeting and viewing coordinate system $R_v$, and the second orthonormal coordinate system $R_{S2}$, which is tightly linked via the second link 44 to the reference coordinate system $R_{ref}$.

The useful information $DDP_{useful}$ that it is sought to deliver to the pilot or to the piloting device and the raw output $DDP_{raw}$ calculated by the DDP posture-detecting subsystem are then related by the relationship:

$$DDP_{useful}=\hat{R}(Ref/S2)*DDP_{raw}*\hat{R}(S1/v)$$

deduced from the relationship:

$$R(Ref/v)=\hat{R}(Ref/S2)*\hat{R}(S2/S1)*R(S1/v)$$

In the dual harmonization method of the invention, it is assumed that the left-side and right-side error matrices, $\hat{R}(Ref/S2)$ and $\hat{R}(S1/v)$, are matrices that are invariant in time and rotation matrices.

The determination of these left and right error matrices $\hat{R}(Ref/S2)$ and $\hat{R}(S1/v)$ is made possible by:

the provision of a number N of orientation measurements $DDP_{raw}$ carried out by the posture-detecting system, corresponding to various measurement stations, i.e. different targeting or pointing directions, using one or more different virtual or real landmarks the attitudes of which are known in the reference coordinate system, and the real rotation matrices $DDP_{useful}$, algorithms for solving a system of dual harmonization equations:

$$DDP_{useful}(i)=\hat{G} \cdot DDP_{raw}(i) \cdot \hat{D}, \text{ i varying from 1 to N}.$$

These algorithms are based on a mathematical method allowing any given (and in practice invertible) matrix A to be "rectified" into a rotation matrix.

The rectification consists in finding, in the set of all of the rotation matrices, the rotation matrix $\pi(A)$ that is the closest to the matrix A in the least-squares sense, i.e. to all of the terms of said matrix A. $\pi(A)$ is called the rectified form of A and $\pi(.)$ is the rectification operator.

The head-up viewing system is configured, by way of the dual harmonization subsystem 16 in particular, to implement all of the embodiments described below of the dual harmonization method according to the invention.

Figure 2:
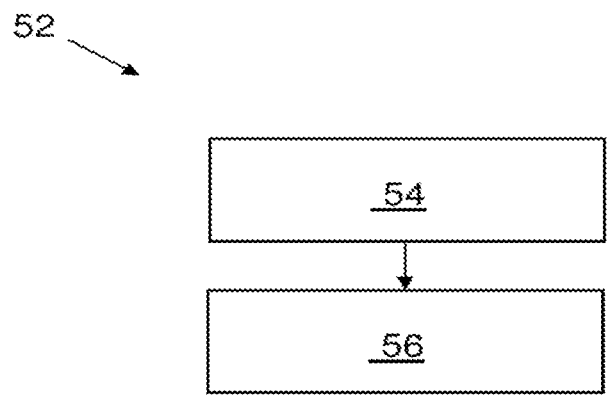
FIG. 2 is a general flowchart of a method for dual harmonization of the posture-detecting subsystem integrated into the worn head-up viewing system.

According to FIG. 2 and generally, a method 52 for dual harmonization of the DDP posture-detecting subsystem 16 integrated into the head-up viewing system 2 or of any output rotation matrix measured and calculated by the detecting subsystem comprises a first step 54 and a second step 56, which are executed in succession.

In the first step 54 of measurement acquisition, a number N of orientation measurements or output matrices $DDP_{raw}(i)$, denoted $\hat{K}_i$ below, i varying from 1 to N and being an index of identification of each measurement, are acquired.

The measurements of the matrices $\hat{K}_i$, i varying from 1 to N, correspond to various measurement stations or to different targeting actions Vi using one or more different real landmarks, and the expected useful DDP value $DDP_{useful}(l)$, designated $\hat{U}_i$ below, of which is theoretically known.

For each measurement station or targeting action Vi, the output rotation value $\hat{K}_i$ calculated by the DDP posture-detecting subsystem 16, and the expected useful rotation value $\hat{U}_i$ are related by the constitutive relationship of the harmonized system: $\hat{U}_i=\hat{G} \cdot \hat{K}_i \cdot \hat{D}$.

In the second step 56, the left and right bias matrices G and $\hat{D}$, which are invariant in time, are determined conjointly by solving the system of dual harmonization equations:

$$\hat{U}_i=\hat{G} \cdot \hat{K}_i \cdot \hat{D}, \text{ i varying from 1 to N}.$$

What should be noted is that, in any way, not described in detail here, knowledge is obtained firstly of a certain number of measurements, which are completely defined by three vectors or a three-dimensional matrix, or only partially defined, a number of matrix coefficients strictly lower than 9 then being partially defined, and secondly of theoretical values that are associated with the corresponding measurement stations, these values also being completely or partially known.

Thus, for each measurement station or targeting action Vi all or some of the three degrees of freedom of $\hat{K}_i$, and all or some of the three degrees of freedom of $\hat{U}_i$ are acquired.

The measurements, nominally consisting in the rotation matrix delivered by the DDP subsystem, therefore contain three delivered degrees of freedom. In practice, the DDP subsystem may deliver only two, or even only a single degree of freedom of the solution allows to solve even if the number of measurement stations increases.

The π rectifying technique used by the global harmonization method according to the invention allows, provided that a sufficient number of measurements are acquired, i.e. a number such that from a mathematical point of view the rank of the system of equations is sufficient, the unknown rotation matrices $\hat{G}$ and $\hat{D}$ to be determined.

The dual harmonization method, because of the rectification technique used, is based on three particular mathematical tools, designated O1, O2 and O3, that, alone or in combination, allow each and every soluble measuring-station configuration to be solved.

According to the first tool O1, when a sequence of rotation matrices, designated by $\{\hat{R}_i\}$, and a sequence of normalized vectors, designated by $\{\vec{e}_i\}$, are given such that the product $\hat{R}_i \cdot \vec{e}_i$ is a constant vector, then the best value of this constant vector $\vec{e}_i$ is given by:

$$\vec{e} = \frac{\sum_i (\hat{R}_i \cdot \vec{e}_i)}{\left\| \sum_i (\hat{R}_i \cdot \vec{e}_i) \right\|}$$

To be able to use the first tool O1, the required minimum number of measurement configurations allowing the harmonization problem to be solved is equal to 1 provided that the mathematical constraint:

$$\sum_i (\hat{R}_i \cdot \vec{e}_i) \neq \vec{0}$$

is met.

According to the second tool O2, when two sequences of vectors $\{\vec{a}_i\}$ and $\{\vec{b}_i\}$ are given such that the second sequence is an image of the first sequence found by applying a constant rotation $\hat{R}$, then the best value of this constant rotation is defined by the equation:

$$\hat{R} = \pi\left(\sum_i (\vec{b}_i \cdot \vec{a}_i^T)\right)$$

in which $(.)^T$ is the transposition operator.

To be able to use the second tool O2, the required minimum number of measurement configurations allowing the harmonization problem to be solved is equal to 2 provided that each of the two families or sequences of vectors $\{\vec{a}_i\}$ and $\{\vec{b}_i\}$ is free.

According to the third tool O3, when a sequence of rotation matrices $\{\hat{R}_i\}$ that are mathematically equal to a constant rotation is given, then the best value of this rotation is defined by the equation:

$$\hat{R} = \pi\left(\sum_i \hat{R}_i\right)$$

To be able to use the third tool O3, the required minimum number of measurement configurations allowing the harmonization problem to be solved is $\Sigma_i \hat{R}_i$ is not a zero matrix, is met.

Figure 3:
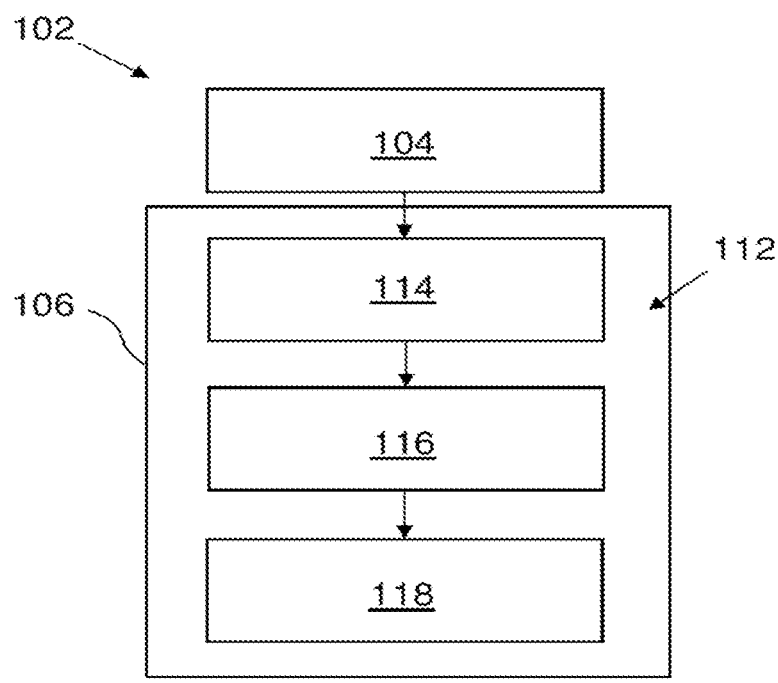
FIG. 3 is a flowchart of a first particular embodiment of a dual harmonization method according to the invention.

In FIG. 3, and in a nominal configuration forming a first harmonization-method configuration 102, a preset number N of raw DDP rotation-matrix measurements $\hat{K}_i$ are carried out in a first step 104, each measurement $\hat{K}_i$ being identified by its advancement index "i", which is comprised between 1 and N.

Each measurement "i" corresponds to a different measurement station in which a first three-dimensional 3D reference mark of the pointing device or targeting device, for example corresponding to a reticle, is aligned with a second three-dimensional 3D reference mark of an external object that is fixed with respect to the fixed coordinate system $R_{ref}$, and therefore one taking account of the three degrees of freedom. For example, a known or preset posture of the helmet of the pilot is captured by an exterior means, for example a robot or a video observation camera, which means is coupled to a means for collecting the output for a rotation with respect to a reference coordinate system, corresponding to an alignment of a three-dimensional 3D image of known position in the coordinate system of the sight of the helmet and a preset real external landscape of known position in the fixed reference coordinate system $R_{ref}$.

It is assumed here that for the sequence of N measurements identified by the index "i" varying from 1 to N, i.e. the calculated rotation matrices $\hat{K}_i$, the corresponding theoretical matrices $\hat{U}_i$ are entirely known.

In this case, and according to the dual harmonization method of the invention, it is necessary to solve the following system of equations:

$$\hat{U}_i = \hat{G} \cdot \hat{K}_i \cdot \hat{D}$$

with i varying from 1 to N.

In a second step 106, the system of equations that was described above is reduced and solved by implementing a first set 112 of first, second and third substeps 114, 116, 118.

In a first substep 114, a "pivot" measurement is chosen, for example the first measurement corresponding to i equal to 1.

It is then possible to verify that for i=2, ..., N: $\hat{U}_1^T \cdot \hat{U}_i = \hat{D}^T \cdot \hat{K}_1^T \cdot \hat{K}_i \cdot \hat{D}$.

Thus, noting $\hat{U}_{1,i} = \hat{U}_1^T \cdot \hat{U}_i$ and $\hat{K}_{1,i} = \hat{K}_1^T \cdot \hat{K}_i$, it is possible to write: $\hat{D} \cdot \hat{U}_{1,i} = \hat{K}_{1,i} \cdot \hat{D}$.

In the first substep 114, the rotation matrices $\hat{U}_{1,i}$ and $\hat{K}_{1,i}$ are thus calculated for i=2, ..., N using the equations: $\hat{U}_{1,i} = \hat{U}_1^T \cdot \hat{U}_i$ and $\hat{K}_{1,i} = \hat{K}_1^T \cdot \hat{K}_i$.

Next, in a second substep 116, the reduction of the system of equations: $\hat{U}_i = \hat{G} \cdot \hat{K}_i \cdot \hat{D}$, i varying from 1 to N, is completed using the fact that the latter equations are mathematically equivalent to: $\hat{D} \cdot \vec{u}_i = \vec{k}_i$, where $\vec{u}_i$ and $\vec{k}_i$ are respectively the principal unit vectors of the rotations $\hat{U}_{1,i}$ and $\hat{K}_{1,i}$.

Thus, in the second substep 116, the principal unit vectors of the rotations $\hat{U}_{1,i}$ and $\hat{K}_{1,i}$, which vectors are designated $\vec{u}_i$ and $\vec{k}_i$, respectively, are determined in a known way for i=2, ..., N.

Next, in a third substep 118, the right matrix $\hat{D}$ is calculated using the equation:

$$\hat{D} = \pi\left(\sum_{i \geq 2} (\vec{k}_i \cdot \vec{u}_i^T)\right)$$

in which $\pi(.)$ is a rectification or projection operator that converts any given matrix A into the 3×3 square rotation matrix π(A) that is, of all 3×3 rotation matrices, the closest, in the least-squares sense, to all of the terms of the matrix π(A)–A.

Next, in a fourth substep 120, the left-side rotation matrix $\hat{G}$ is determined on the basis of the matrix $\hat{D}$, which was calculated in the third substep 118, using the equation:

$$\hat{G} = \pi\left(\sum_{i\geq 1}(\hat{U}_i \cdot \hat{D}^T \cdot \hat{k}_i^T)\right)$$

It will be noted that mathematical study of the projection π shows that the choice of the pivot among the N measurements is without influence on the final result of the harmonization.

It will also be noted that mathematical study of the projection π shows that the choice as to whether to determine $\hat{D}$ or $\hat{G}$ first is also without influence; it is possible to start by eliminating $\hat{D}$ by making $\hat{U}_i \cdot \hat{U}_1^T = \hat{G} \cdot \hat{K}_i \cdot \hat{K}_1^T \cdot \hat{G}^T$ and to likewise solve.

This first configuration 102, which is able to correct up to six degrees of freedom, requires, by way of operating constraints, the minimum number N of measurements to be higher than or equal to 3, and the axes of the rotations $\hat{U}_i$ to be distinct for at least three different values of the index "i".

Figure 4:
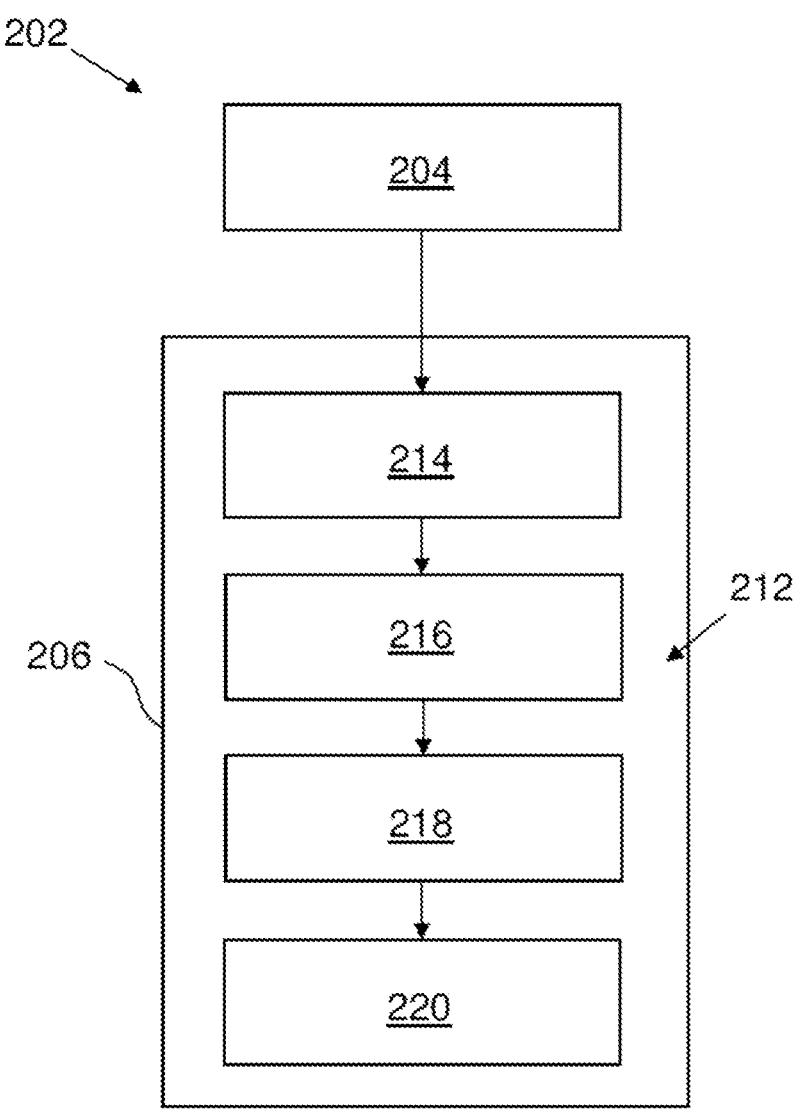
FIG. 4 is a flowchart of a second particular embodiment of a dual harmonization method according to the invention.

In FIG. 4 and in a second configuration 202, which is degraded with respect to the nominal configuration 102, a first step 204 of acquiring measurements is implemented. This first step 204 implements same first step 104 of acquiring N measurements of rotation matrices $\hat{K}_i$, which matrices are calculated with measurement stations that are identical to those of the nominal configuration, but it is here assuming that, for the calculated matrices $\hat{K}_i$, the azimuth value is inexact or not calculated, or in any case inexploitable.

This poor knowledge of the azimuth value is expressed mathematically by writing, in the first step, that, for any i, varying from 1 to N, the matrix $\hat{K}_i$ may be decomposed as follows: $\hat{K}_i = \hat{\Psi}_i \cdot \hat{Q}_i$, where $\hat{\Psi}_i$ is an unknown rotation matrix of elementary azimuthal form:

$$\begin{pmatrix} \cos\psi i & -\sin\psi i & 0 \\ \sin\psi i & \cos\psi i & 0 \\ 0 & 0 & 1 \end{pmatrix};$$

and $\hat{Q}_i$ is a known rotation matrix.

Thus, the general starting equations become:

$\hat{U}_i = \hat{G} \cdot \hat{\Psi}_i \cdot \hat{Q}_i \cdot \hat{D}$ for $i$ varying from 1 to $N$.

In a second step 206, the system of equations that was described above is reduced and solved, to determine the right bias matrix $\hat{D}$, by implementing a second subset 212 of the following substeps.

In a fourth substep 214, a pivot measurement is created, for example a pivot first measurement corresponding to i equal to 1.

For i=2, . . . , N, it may be verified that: $\hat{U}_1^T \cdot \hat{U}_i = \hat{D}^T \cdot \hat{Q}_1^T \cdot \hat{\Psi}_1^T \cdot \hat{\Psi}_i \cdot \hat{Q}_i \cdot \hat{D}$.

By noting for i=2, . . . , N, $\Psi_{1,i} = \hat{\Psi}_1^T \cdot \hat{\Psi}_i$, which are unknown rotation matrices of elementary azimuthal form, and $\hat{U}_{1,i} = \hat{U}_1^T \cdot \hat{U}_i$, the following system of equations is obtained:

$\hat{Q}_1 \cdot \hat{D} \cdot \hat{U}_{1,i} \cdot \hat{D}^T \cdot \hat{Q}_i^T = \hat{\Psi}_{1,i}$, $i$ varying from 2 to $N$.

In a second substep, to eliminate the unknown matrices $\hat{\Psi}_{1,i}$, the fact that said matrices $\hat{\Psi}_{1,i}$ are of elementary azimuthal form and that they leave the vector $$\vec{k} = \begin{pmatrix} 0 \\ 0 \\ 1 \end{pmatrix}$$

unchanged, i.e. they respect the following equations:

$$\begin{pmatrix} \cos\psi & -\sin\psi & 0 \\ \sin\psi & \cos\psi & 0 \\ 0 & 0 & 1 \end{pmatrix} \begin{pmatrix} 0 \\ 0 \\ 1 \end{pmatrix} = \begin{pmatrix} 0 \\ 0 \\ 1 \end{pmatrix},$$

$i$ varying from 2 to N, is used.

Therefore, for each and every i=2, . . . ,N: $\hat{Q}_1 \cdot \hat{D} \cdot \hat{U}_{1,i} \cdot \hat{D}^T \cdot \hat{Q}_i^T \cdot \vec{k} = \vec{k}$, which will be written:

$\hat{U}_{1,i} \cdot \hat{D}^T \cdot \hat{Q}_i^T \cdot \vec{k} = \hat{D}^T \cdot \hat{Q}_1^T \cdot \vec{k}$.

Noting $\vec{d} = \hat{D}^T \cdot Q_1^T \cdot k$, which is therefore an unknown vector, and $\vec{q}_i = \hat{Q}_i^T \cdot \vec{k}$, which for their part are known vectors, the following system of equations to be solved is obtained:

$\hat{U}_{1,i} \cdot \hat{D}^T \cdot \vec{q}_i = \vec{d}$ for each and every $i=2, \ldots, N$.

In the same fourth substep 214, for i=2, . . . ,N, the matrices $\hat{U}_{1,i}$ and the vectors $\vec{q}_i$ are calculated using the following equations:

$\hat{U}_{1,i} = \hat{U}_1^T \cdot \hat{U}_i$ and $\vec{q}_i = \hat{Q}_i^T \cdot \vec{k}$ Next, in the fifth, sixth and seventh substeps 216, 218, 220, the system of equations: $\vec{q}_i = \vec{d}$ for each and every i=2, . . . , N, is solved iteratively using the first tool O1 and the third tool O3.

In a fifth substep 216, a first sequence of matrices $\{\hat{D}_{[s]}\}$, [s] designating the current index of a term $\hat{D}_{[s]}$ of the sequence, is initialized by setting $\hat{D}_{[0]}$ equal to $I_3$, $I_3$ being the identity matrix.

Next, in the iterative sixth substep 218 in which iteration [s+1] is passed to from iteration [s] by calculating the vector value $\vec{d}_{[s+1]}$, then the value $\hat{D}_{[s+1]}$ of the first matrix sequence $\{\hat{D}_{[s]}\}$, using the following recurrence relationships:

$$\vec{d}_{[s+1]} = \frac{\sum_{i\geq 2}(\hat{U}_{1,i} \cdot \hat{D}_{[s]}^T \cdot \vec{q}_i)}{\|\sum_{i\geq 2}(\hat{U}_{1,i} \cdot \hat{D}^T \cdot \vec{q}_i)\|}$$

$$\hat{D}_{[s+1]} = \pi\left(\sum_{i\geq 2}(\vec{q}_i \cdot \vec{d}_{[s+1]}^T \cdot \hat{U}_{1,i})\right)$$

$\hat{D}$ is calculated as being a limit or an approximate limit of the sequence $\hat{D}_{[s]}$, which is convergent.

In a seventh substep 220, the iterative process carried out throughout the sixth substep 218 is stopped when the limit $\hat{D}$ is approximated with a sufficient precision defined by a preset threshold value.

Next, in the second step 206, the system of equations: $\hat{Q}_1 \cdot \hat{D} \cdot \hat{U}_{1,i} \cdot \hat{D}^T \cdot \hat{Q}_i^T = \hat{\Psi}_{1,i}$, i varying from 1 to N, is reduced and solved, to determine the left bias matrix $\hat{G}$, by implementing a set of substeps analogous to the second set 212, by creating a pivot on the right.

This second configuration 202 requires, by way of operating constraints, the minimum number N of measurements to be higher than or equal to 4, and the axes of the rotations $\hat{U}_i$ to be distinct for at least three different values of the index "i".

Figure 5:
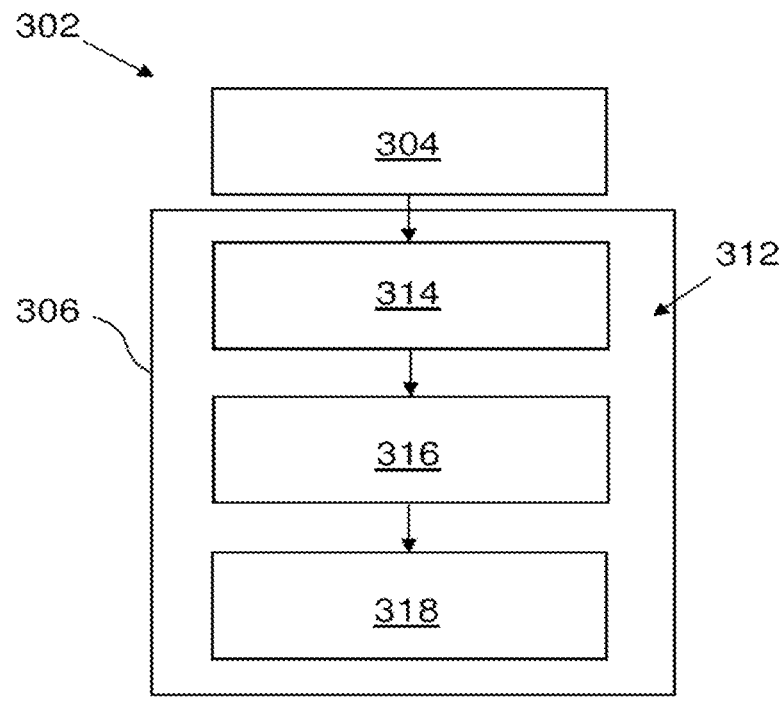
FIG. 5 is a flowchart of a third particular embodiment of a dual harmonization method according to the invention.

In FIG. 5 and in a third configuration 302, which is degraded with respect to the nominal first configuration 102, a first step 304 of acquiring measurements is carried out in which N measurements of raw rotation matrices $\hat{K}_I$ are performed by the DDP posture-detecting subsystem 16.

These measurements of raw rotation matrices $\hat{K}_I$, varying from 1 to N, correspond to targeting actions Vi in which a plurality of different targeting directions $\vec{x}_I$ of the viewing device $D_v$ serving as sight are respectively aligned with a plurality of different directions $\vec{y}_I$ that are known in the reference exterior coordinate system $R_{Ref}$ without roll adjustment, i.e. without rotation of the head about the line of sight.

For example, the pilot targets with various cross-shaped reticles, displayed on the sight $D_v$, various preset directions that are known in the reference exterior coordinate system $R_{Ref}$ without roll adjustment.

In this measuring first step 304, the N rotator matrices $\hat{K}_i$, measured and calculated by the posture-detecting subsystem 16 are entirely known, i.e. all their components are known. The two families of normalized or direction vectors $\{\vec{x}_i\}$ and $\{\vec{y}_i\}$ are also assumed to be free and to allow the general system of dual harmonization equations to be reduced to the particular system of dual harmonization equations:

$\vec{y}_i = \hat{G} \cdot \hat{K}_i \cdot \hat{D} \cdot \vec{x}_i$, varying from 1 to N.

Next, in a second step 306, the system of dual harmonization equations: $\vec{y}_i = \hat{G} \cdot \hat{K}_i \cdot \hat{D} \cdot \vec{x}_i$ for i varying from 1 to N, is reduced and solved iteratively by using two times the second tool O2 and by implementing a third set 312 of the following substeps.

In an eighth substep 314, a first sequence of left matrices $\{\hat{G}_{[s]}\}$, [s] designating the integer rank of advancement through this first sequence, is initialized by setting $\hat{G}_{[0]}$ equal $I_3$, $I_3$ being the identity matrix.

Next, an iterative ninth substep 316 is repeated, in which substep iteration [s+1] is passed to from iteration [s] by calculating the matrix value $\hat{D}_{[s+1]}$ then the matrix value $\hat{G}_{[s+1]}$ using the following equations:

$$\hat{D}_{[s+1]} = \pi \left( \sum_{i \geq 1} (\hat{K}_i^T \cdot \hat{G}_{[s]}^T \cdot \vec{y}_i \cdot \vec{x}_i^T) \right)$$

$$\hat{G}_{[s+1]} = \pi \left( \sum_{i \geq 1} (\vec{y}_i \cdot \vec{x}_i^T \cdot \hat{D}_{[s+1]}^T \cdot \hat{K}_i^T) \right)$$

the sequence $\{\hat{D}_{[s]}\}$ being a second sequence of right matrices.

The sequences $\hat{D}_{[s]}$ and $\hat{G}_{[s]}$ converge to $\hat{D}$ and $\hat{G}$, respectively.

In a tenth substep 318, the iterative process executed throughout the ninth substep 316 is stopped when the limits $\hat{D}$ and $\hat{G}$ are approximated with a sufficient precision.

This third configuration requires, by way of operating constraints, the minimum number N of measurements to be higher than or equal to 4, and the vector families $\{\vec{x}_i\}$ and $\{\vec{y}_i\}$ both to be free.

Figure 6:
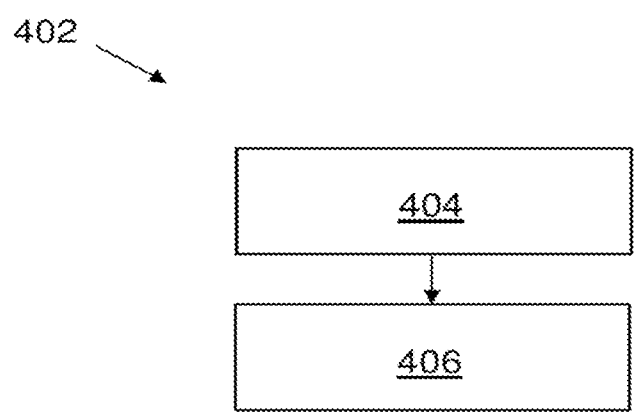
FIG. 6 is a flowchart of a fourth particular embodiment of a dual harmonization method according to the invention.

In FIG. 6 and in a fourth configuration 402, which is degraded with respect to the nominal first configuration 102, a first step 404 of acquiring N measurements of raw rotation matrices $\hat{K}_I$ is executed.

The N raw rotation matrices $\hat{K}_I$, which are measured by the posture-detecting subsystem, correspond to a plurality of targeting actions Vi that are more constrained than the targeting actions performed in the third configuration 302.

The targeting actions Vi of the fourth configuration 402 correspond to an alignment of N different targeting directions $\vec{x}_I$ of the sight $D_v$ with one and the same direction $\vec{y}_0$, which direction is known in the exterior reference coordinate system $R_{ref}$ without roll adjustment, i.e. without rotation of the head about the line of sight. For example, the pilot targets with various cross-shaped reticles of the sight, one and the same preset direction, which direction is known in the reference exterior coordinate system, without roll adjustment.

In this fourth configuration 402, it is then only possible to calculate the right bias rotation matrix $\hat{D}$ and the left bias rotation matrix $\hat{G}$ is assumed to be known.

In this measuring first step 404, the N rotation matrices $\hat{K}_I$, which are measured and calculated by the posture-detecting subsystem 16, are entirely known, i.e. all their components are known. Assuming the family of normalized or direction vectors $\{\vec{x}_i\}$ of the sight to also be free, and the targeted external unit vector $\vec{y}_0$ to be known and the left bias rotation matrix $\hat{G}$ to be known, the general system of dual harmonization equations reduces to the particular system of dual harmonization equations:

$\hat{G} \cdot \hat{K}_i \cdot \hat{D} \cdot \vec{x}_i = \vec{y}_0$, i varying from 1 to N.

Therefore, only the right bias rotation matrix $\hat{D}$ is sought.

Next, in a second step 406, the system of dual harmonization equations: $\hat{G} \cdot \hat{K}_i \cdot \hat{D} \cdot \vec{x}_i = \vec{y}_0$, for i varying from 1 to N, is reduced and solved, and the sought right matrix $\hat{D}$ is determined via the following equation:

$$\hat{D} = \pi \left( \sum_{i \geq 1} (\hat{K}_i^T \cdot \hat{G}^T \cdot \vec{y}_0 \cdot \vec{x}_i^T) \right)$$

This fourth configuration requires, by way of operating constraints, the minimum number N of measurements to be higher than or equal to 3 and the vector family $\{\vec{x}_i\}$ to be free.

It will be noted that, with the targeting method of the fourth configuration 402, it is not possible, knowing $\hat{D}$, to calculate $\hat{G}$. Specifically, knowing $\hat{G}$, it is easy to show that a suitable choice of the freedoms in the family $\{\vec{x}_i\}$ will allow the operator $\Sigma_{i \geq 1}(\hat{K}_i^T \cdot G^T \cdot \vec{y}_0 \cdot \vec{x}_i^T)$ to be made reversible, i.e. of rank 3, and therefore, via rectification thereof, $\hat{D}$ to be found. In contrast, if $\hat{D}$ is assumed to be known, G must necessarily be the rectified form of the operator $\Sigma_{i \geq 1}(\vec{y}_0 \cdot \vec{x}_i^T \cdot \hat{D}^T \cdot \hat{K}_i^T)$; however, this operator is at best of rank 1, and therefore its rank is insufficient because its image is either zero, or reduced to the straight line expressed by $\vec{y}_0$.

Figure 7:
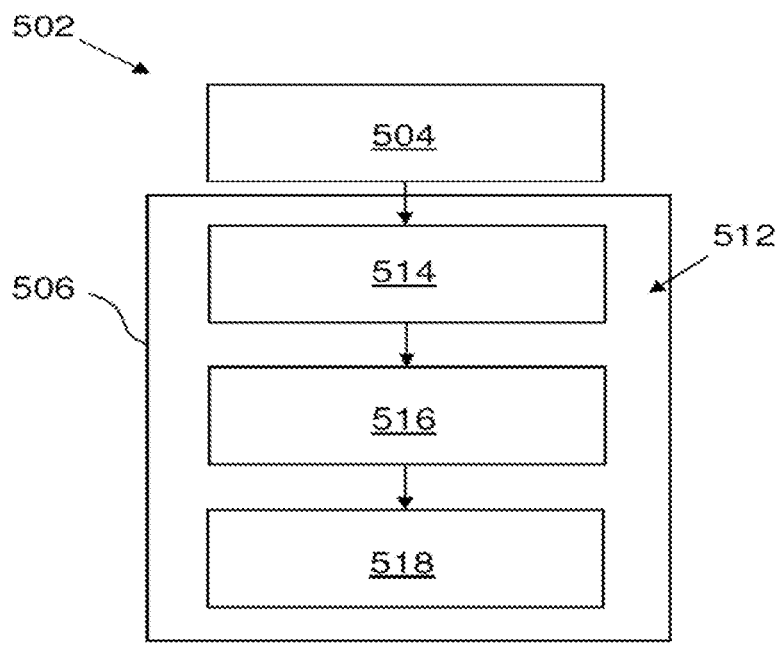
FIG. 7 is a flowchart of a fifth particular embodiment of a dual harmonization method according to the invention.

In FIG. 7 and in a fifth configuration 502, which is degraded with respect to the nominal first configuration 102, a first step of acquiring N measurements is carried out in which N rotation matrices $\hat{K}_I$ are calculated by the posture-detecting device.

The N calculated rotation matrices $\hat{K}_I$ correspond to N measurement stations or targeting actions Vi that differ from those of the fourth configuration 402 in that the coordinates of the targeted exterior direction $\vec{y}_0$ are unknown.

The targeting actions Vi of the fifth configuration 502 correspond to an alignment of N different targeting directions $\vec{x}_I$ of the sight $D_v$ with one and the same exterior direction $\vec{y}_0$ the coordinates of which are unknown, without roll adjustment, i.e. without rotation of the head about the targeting line. For example, the pilot targets with various cross-shaped reticles of the sight one and the same unknown external direction without roll adjustment.

In this fifth configuration, it is still possible to only calculate the right rotation matrix $\hat{D}$, but it is also possible to calculate the coordinates of the exterior targeting direction if it is desired to do so.

In this measuring first step 504, the N rotation matrices $\hat{K}_I$ which are measured and calculated by the posture-detecting subsystem 16, are entirely known, i.e. all their components are known. Assuming the family of normalized or direction vectors $\{\vec{x}_i\}$ to also be free, and the targeted external unit vector $\vec{y}_0$ to be unknown and the left bias rotation matrix $\hat{G}$ to be known, the general system of dual harmonization equations reduces to the particular system of dual harmonization equations:

$$\hat{G} \cdot \hat{K}_i \cdot \hat{D} \cdot \vec{x}_i = \vec{y}_0, \text{ varying from 1 to } N.$$

Only the right rotation matrix $\hat{D}$, and if it is desired the targeted exterior direction, which direction is expressed in the reference external coordinate system $R_{Ref}$, may be determined.

In a second step 506, the system of dual harmonization equations: $\vec{G} \cdot \hat{K}_i \hat{D} \cdot \vec{x}_i = \vec{y}_0$ for i varying from 1 to N, is solved iteratively by implementing a fifth set 512 of the following eleventh, twelfth and thirteenth substeps 514, 516, 518.

In the eleventh substep 514, a first sequence of right matrices $\{\hat{D}_{[s]}\}$, [s] designating the integer rank of advancement through the sequence $\{\hat{D}_{[s]}\}$, is initialized by setting $\hat{D}_{[0]}$ equal to $I_3$, $I_3$ being the identity matrix.

Next, the iterative twelfth substep 516 is repeated, in which substep iteration [s+1] is passed to from iteration [s] by calculating the vector $\hat{y}_{[s+1]}$ then the matrix $\hat{D}_{[s+1]}$ using the following equations:

$$\vec{y}_{[s+1]} = \frac{\sum_{i \geq 1}(\hat{G} \cdot \hat{K}_i \cdot \hat{D}_{[s]} \cdot \hat{x}_i)}{\|\sum_{i \geq 1}(\hat{G} \cdot \hat{K}_i \cdot \hat{D}_{[s]} \cdot \hat{x}_i)\|}$$

$$\hat{D}_{[s+1]} = \pi\left(\sum_{i \geq 1}(\hat{K}_i^T \cdot \hat{G}^T \cdot \vec{y}_{[s+1]} \cdot \vec{x}_i^T)\right)$$

the sequence $\{\vec{y}_{[s]}\}$ being a second sequence of external direction vectors.

The sequences $\{\vec{y}_{[s]}\}$ and $\{\hat{D}_{[s]}\}$ converge to $\vec{y}_0$ and $\hat{D}$, respectively.

In the thirteenth step 518, the iterative process carried out throughout the twelfth substep 516 is stopped when the limits $\hat{D}$ and $\hat{G}$ are approximated with a sufficient precision, defined by one or two preset threshold values.

This fifth configuration requires, by way of operating constraints, the minimum number N of measurements to be higher than or equal to 4, and the vector family $\{\vec{x}_i\}$ to be free.

Figure 8:
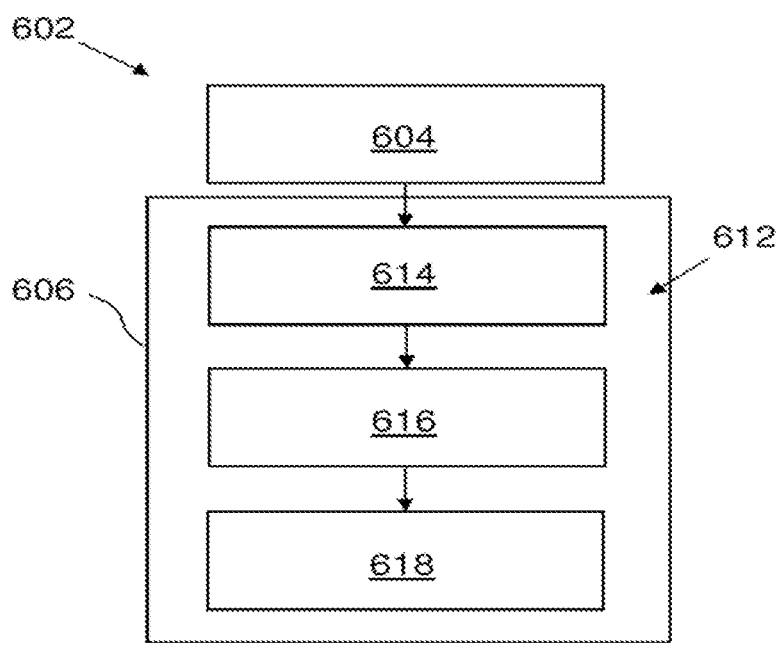
FIG. 8 is a flowchart of a sixth particular embodiment of a dual harmonization method according to the invention.

In FIG. 8 and in a sixth configuration 602, which is degraded with respect to the nominal first configuration 102, a first step 604 of acquiring N measurements is carried out in which N rotation matrices $\hat{K}_I$ are calculated by the posture-detecting device 16.

The N calculated rotation matrices $\hat{K}_I$ here correspond to N targeting actions Vi that are identical to those of the fifth configuration 502 in that N alignments of targeting direction $\vec{x}_i$ are carried out with one and the same targeted exterior direction $\vec{y}_0$ without roll adjustment, and in that the targeted exterior direction $\vec{y}_0$ is unknown, but that differ from those of the fifth configuration 502 in that the left bias rotation matrix is unknown.

In this sixth configuration 602, it is still possible to only calculate the right rotation matrix $\hat{D}$, but it is also possible to calculate the coordinates of the unknown targeted exterior direction $\vec{y}_0$.

The N measured and calculated rotation matrices $\hat{K}_i$ are assumed to be entirely known, i.e. all their components are known. The family of known normalized or direction vectors $\{\vec{x}_i\}$ of the sight and the unknown unit vector $\vec{y}_0$ of the targeted external direction are related in the system of dual harmonization equations: $\hat{G} \cdot \hat{K}_i \cdot \hat{D} \cdot \vec{x}_i = \vec{y}_0$, for each and every i=1 to N, the matrix $\hat{G}$ being unknown, and only the right bias rotation matrix $\hat{D}$ being able to be determined.

By noting $\vec{z}_0 = \hat{G}^T \cdot \vec{y}_0$, for i equal to 1 to N, the equations $\vec{G} \cdot \hat{K}_i \hat{D} \cdot \vec{x}_i = \vec{y}_0$ are reduced to the system of dual harmonization equations:

$$\hat{K}_i \cdot \hat{D} \cdot \vec{x}_i = \vec{z}_0, \text{ for } i \text{ equal to 1 to } N.$$

In a second step 604, the system of equations $\hat{K}_i \cdot \hat{D} \cdot \vec{x}_i = \vec{z}_0$ for i varying from 1 to N with $\vec{z}_0 = \hat{G}^T \cdot \vec{y}_0$, is solved iteratively by implementing a sixth set 612 of the following substeps.

In a fourteenth substep 614, a first sequence of right matrices $\{\hat{D}_{[s]}\}$, [s] designating the integer rank of advancement through the sequence $\{\hat{D}_{[s]}\}$, is initialized by setting $\hat{D}_{[0]}$ equal to $I_3$, $I_3$ being the identity matrix.

Next, an iterative fifteenth substep 616 is repeated, in which substep iteration [s+1] is passed to from iteration [s] by calculating the vector $\vec{z}_{[s+1]}$ then the matrix $\hat{D}_{[s+1]}$ using the following equations:

$$\vec{z}_{[s+1]} = \frac{\sum_{i \geq 1}(\hat{K}_i \cdot \hat{D}_{[s]} \cdot \vec{x}_i)}{\|\sum_{i \geq 1}(\hat{K}_i \cdot \hat{D}_{[s]} \cdot \vec{x}_i)\|}$$

$$\hat{D}_{[s+1]} = \pi\left(\sum_{i \geq 1}(\hat{K}_i^T \cdot \vec{z}_{[s+1]} \cdot \vec{x}_i^T)\right)$$

the sequence $\{\vec{z}_{[s]}\}$ being an auxiliary second sequence of external direction vectors and the sequences $\{\hat{D}_{[s]}\}$ converging to $\hat{D}$.

Next, in a sixteenth step 616, the iterative process carried out throughout the fifteenth substep 614 is stopped when the limit $\hat{D}$ is approximated with a sufficient precision defined by a threshold value.

This sixth configuration 602 requires, by way of operating constraints, the minimum number N of measurements to be higher than or equal to 4, and the vector family $\{\vec{x}_i\}$ to be free.

Just as in the fifth configuration 502, with this targeting method 602 it is not possible to calculate $\hat{G}$ knowing $\hat{D}$.

Figure 9:
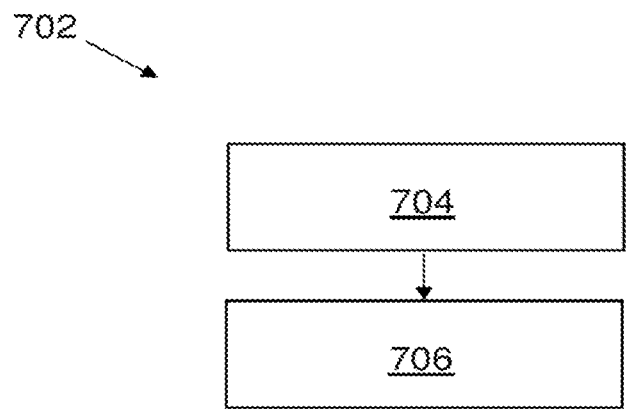
FIG. 9 is a flowchart of a seventh particular embodiment of a dual harmonization method according to the invention.

In FIG. 9 and in a seventh configuration 702, which is degraded with respect to the nominal first configuration, a first step 704 of acquiring N measurements is carried out, in which step N raw DDP rotation matrices $\hat{K}_i$ are calculated by the posture-detecting subsystem 16.

The N measured and calculated rotation matrices $\hat{K}_i$ correspond to N targeting actions Vi, i varying from 1 to N, in which one and the same targeting direction $\vec{x}_0$ on the sight is aligned with a plurality of targeted or aimed at or pointed exterior directions, without taking into account roll of the head.

For example, the pilot targets with a single cruciform reticle of position that is known in the coordinate system $R_v$ of the sight, a plurality of preset exterior directions $\vec{y}_I$ in the reference exterior coordinate system $R_{Ref}$, without roll adjustment, i.e. without performing a rotation about the line of sight. It is then possible to only calculate the right rotation matrix $\hat{D}$, the left rotation matrix $\hat{G}$ being assumed to be known.

The N measured rotation matrices $\hat{K}_i$, which are assumed to be entirely known, i.e. all their components are assumed to be known, the family of the normalized vectors $\{\vec{y}_i\}$ of the targeted exterior directions, which is assumed to be known, and the known unit vector $\vec{x}_0$ of the single targeting direction are related by the system of dual harmonization equations: $\hat{G}\cdot\hat{K}_i\cdot\hat{D}\cdot\vec{x}_0=\vec{y}_i$, for each and every i=1 to N, in which system of equations the right rotation matrix $\hat{D}$ is known and the left matrix $\hat{G}$ is sought.

Next, in a second step 706, the system of dual harmonization equations: $\hat{G}\cdot\hat{K}_i\cdot\hat{D}\cdot\vec{x}_0=\vec{y}_i$, for i varying from 1 to N, is solved by determining the sought left rotation matrix $\hat{G}$ using the equation:

$$\hat{G} = \pi\left(\sum_{i\geq 1}(\vec{y}_i\cdot\vec{x}_0^T\cdot\hat{D}^T\cdot\hat{K}_i^T)\right)$$

This seventh configuration 702 requires, by way of operating constraints, the minimum number N of measurements to be higher than or equal to 3 and the vector family $\{\vec{y}_i\}$ to be free.

Figure 10:
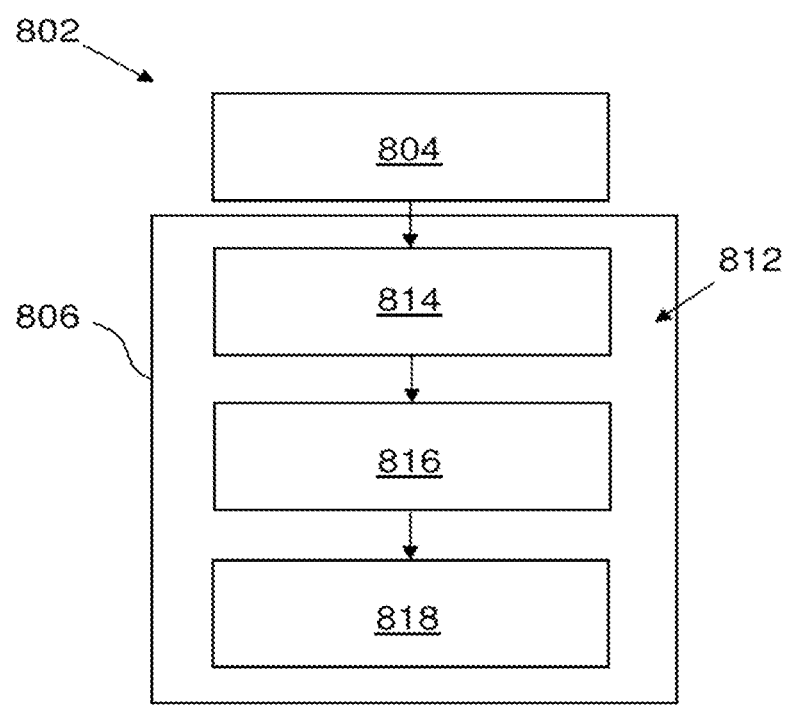
FIG. 10 is a flowchart of an eighth particular embodiment of a dual harmonization method according to the invention.

In the FIG. 10 and in an eighth configuration 802, which is degraded with respect to the nominal first configuration 102, a first step 804 of acquiring N measurements is carried out, in which step N rotation matrices $\hat{K}_i$ are calculated by the posture-detecting device.

The N measured and calculated rotation matrices $\hat{K}_i$ correspond to N targeting actions Vi that are identical to those of the seventh configuration 702 in that N alignments are carried out of one and the same targeting direction $\vec{x}_0$ on the sight and of a plurality of targeted or aimed at or pointed to exterior directions that are known, without taking into account roll of the head, and in that the right rotation matrix $\hat{D}$ is known, but that differ from those of the seventh configuration 702 in that the targeting direction $\vec{x}_0$ is unknown.

The N measured rotation matrices $\hat{K}_i$, which are assumed to be entirely known, i.e. all their components are known, the family of normalized vectors $\{\vec{y}_i\}$ of the targeted exterior directions, which is assumed to be known, and the unknown unit vector $\vec{x}_0$ of the single targeted direction are related by the system of dual harmonization equations: $\hat{G}\cdot\hat{K}_i\cdot\hat{D}\cdot\vec{x}_0=\vec{y}_i$, for each and every i=1 to N, in which system of equations the right rotation matrix $\hat{D}$ is known and the left matrix G and optionally the sight targeting direction are sought.

In this eighth configuration 802, it is possible to only calculate the left rotation matrix $\hat{G}$, though the coordinates of the single targeting direction $\vec{x}_0$ in the sight coordinate system may also be calculated.

Next, in a second step 806, the system of dual harmonization equations: $\hat{G}\cdot\hat{K}_i\cdot\hat{D}\cdot\vec{x}_0=\vec{y}_i$ for i varying from 1 to N, is solved iteratively by implementing an eighth set of the following substeps.

In a seventeenth substep 814, a first sequence of left matrices $\{\hat{G}_{[s]}\}$, [s] designating the integer rank of advancement through the sequence $\{\hat{G}_{[s]}\}$, is initialized by setting $\hat{G}_{[0]}$ equal to $I_3$, $I_3$ being the identity matrix.

Next, an iterative eighteenth substep 816 is repeated, in which substep iteration [s+1] is passed to from iteration [s] by calculating the vector $\vec{x}_{[s+1]}$, then the matrix $\hat{G}_{[s+1]}$ using the following equations:

$$\vec{x}_{[s+1]} = \frac{\sum_{i\geq 1}(\hat{D}^T\cdot\hat{K}_i^T\cdot\hat{G}_{[s]}^T\cdot\vec{y}_i)}{\|\sum_{i\geq 1}(\hat{D}^T\cdot\hat{K}_i^T\cdot\hat{G}_{[s]}^T\cdot\vec{y}_i)\|}$$

$$\hat{G}_{[s+1]} = \pi\left(\sum_{i\geq 1}(\vec{y}_i\cdot\vec{x}_{[s+1]}^T\cdot\hat{D}^T\cdot\hat{K}_i^T)\right)$$

the sequence $\{\vec{x}_{[s]}\}$ being a second sequence of sight direction vectors.

The sequences $\hat{G}_{[s]}$ and $\vec{x}\times_{[s]}$ then converge to $\hat{G}$ and $\vec{x}_0$, respectively.

In a nineteenth substep 818, the iterative process carried out throughout the eighteenth substep 816 is stopped when the limit $\hat{G}$ and optionally the limit $\vec{x}_0$ are approximated with a sufficient precision defined by one or two preset threshold values.

This eighth configuration 802 requires, by way of operating constraints, the minimum number N of measurements to be higher than or equal to 4 and the vector family $\{\vec{y}_i\}$ to be free.

It will be noted that the solving method described for the above seven degraded configurations is generalizable to any other configuration of the same type.

It will be noted that the invention also allows a harmonized relative deviation between the outputs delivered by two DDP posture-detecting systems that are tightly fastened to each other to be delivered.

The first DDP detecting system delivering the rotation $\hat{R}(R_{v1}/R_{ref1})$ between a first sight coordinate system $R_{v1}$ and a first fixed exterior coordinate system $R_{ref1}$, and the harmonized second posture-detecting system $\hat{R}(R_{v2}/R_{ref2})$ delivering the rotation between a second sight coordinate system $R_{v2}$ and a second fixed exterior coordinate system $R_{ref2}$, the method according to the invention allows the rotation matrix $\hat{R}(R_{v2}/R_{v1})$ of the rotation between the first sight coordinate system $R_{v1}$ and the second sight coordinate system $R_{v2}$ to be calculated as a left matrix, and the rotation matrix $\hat{R}(R_{ref2}/R_{ref1})$ of the rotation between the first fixed exterior coordinate system $R_{ref1}$ and the second fixed coordinate system $R_{ref2}$ to be calculated as a right matrix.

Specifically, the problem is mathematically equivalent to the preceding one since it is possible to write:

$$\hat{R}(R_{v2}/R_{ref2}) = \hat{R}(R_{ref2}/R_{ref1})^T \cdot \hat{R}(R_{v1}/R_{ref1}) \cdot \hat{R}(R_{v2}/R_{v1}),$$

$\hat{G} = \hat{R}(R_{ref2}/R_{ref1})^T$ and $\hat{D} = \hat{R}(R_{v2}/R_{v1})$ are then sought.

Likewise, in the case where it is sought to determine the relative deviation between two tightly fastened DDP systems, the measurements delivered by each of the DDPs do not need to be complete.

Regarding the algorithmic method for achieving global DDP harmonization and the variants thereof described above, the essential features are:
the universal and generic character of the Tr rectifying method used, which allows each and every solvable case to be treated with matrix mathematics, without ever having to make use of elaborate mathematical functions, in particular trigonometric functions;
the flexibility of application of the rectification Tr, which in essence allows problems to be reduced independently from the order of the elements to be treated.

Regarding the global harmonization of a posture detection implemented by a posture-detecting system or the characterization of a deviation between the posture detections delivered by two posture-detecting systems using the algorithmic harmonization process according to the invention, the essential features are:
the fact that it is possible to completely harmonize the DDP posture-detecting method and system without needing to perform partial harmonizations of each element, which each time require exact knowledge of the posture of the other element, and which in practice transfer residual errors;
the fact that it is possible to completely harmonize the DDP posture-detecting method and system without knowing beforehand which element or elements are poorly aligned;
the fact that it is possible to harmonize the posture-detecting method and system without the expected data or measurements being integrally known.

Generally, the head-up viewing system 2 described above and configured to implement the dual harmonization method according to the invention is intended to be located on-board a carrier vehicle comprised in the set of all aircraft, aeroplanes, helicopters, motor vehicles and robots.

The invention claimed is:

1. A method for dual harmonization of a DDP posture-detecting subsystem integrated into a worn/borne head-up viewing system,
the worn/borne head-up viewing system being located on-board a carrier vehicle and comprising:
a transparent worn/borne head-up viewing device $D_v$,
an exterior reference device $D_{ref}$ having an exterior reference coordinate system $R_{ref}$, that is a coordinate system of the carrier vehicle or a local geographic coordinate system or a terrestrial coordinate system;
the DDP posture-detecting subsystem comprising:
a tracking solid first element S1 tightly attached to the transparent worn/borne head-up viewing device $D_v$; and
a fixed solid second element S2 tightly joined to the exterior reference device $D_{ref}$ wherein the DDP posture-detecting subsystem is configured to measure and determine a relative orientation $\hat{K}$ of the tracking solid first element S1 with respect to the fixed solid second element S2,
a dual harmonization subsystem configured to harmonize the worn/borne head-up viewing system and the DDP posture-detecting subsystem,
the method for dual harmonization comprising:
in a first step, a series of a preset number N of measurements of relative orientations $\hat{K}_i$, i varying from 1 to N, of the tracking solid first element S1 with respect to the fixed solid second element S2 of the DDP posture-detecting subsystem, corresponding to different targeting actions Vi, i varying from 1 to N, that are carried out, in which measurements of one or more different preset elements of pilot/driver information displayed in the transparent worn/borne head-up viewing device $D_v$ are superposed or aligned with one or more corresponding landmarks of a real outside world, theoretical rotation matrices $\hat{U}_i$ of which in the exterior reference coordinate system are known; then
in a second step, and using a dual harmonization algorithm, conjointly calculating a relative orientation matrix $\hat{R}(S1/v)$ of the tracking solid first element S1 of the DDP posture-detecting subsystem with respect to the transparent worn/borne head-up viewing device $D_v$ and/or a relative orientation matrix $\hat{R}(ref/S2)$ of the exterior reference device $D_{ref}$ with respect to the fixed solid second element S2 of the DDP posture-detecting subsystem to respectively be a right-side bias rotation matrix $\hat{D}$ and a left-side bias rotation matrix $\hat{G}$, which are conjoint solutions of a system of dual harmonization equations: $\hat{U}_i = \hat{G} \cdot \hat{K}_i \cdot \hat{D}$, i varying from 1 to N.

2. The method for dual harmonization of a DDP posture-detecting subsystem integrated into a worn/borne head-up viewing system according to claim 1, wherein
a minimum required number N of measurements depends on a number L of erroneous or inexploitable degrees of angular freedom of the rotation matrices $\hat{R}(S1/v)$ and $\hat{R}(ref/S2)$ of the head-up viewing system, said number L being an integer higher than or equal to 1 and lower than or equal to 6, and
the solution of the system of equations $\hat{U}_i = \hat{G} \cdot \hat{K}_i \cdot \hat{D}$, i varying from 1 to N, uses a rectification operator $\pi(.)$ that converts any given matrix A into a 3×3 square rotation matrix $\pi(A)$, which matrix $\pi(A)$, of all the 3×3 rotation matrices, is the closest in the least-squares sense to all of the terms of the matrix $\pi(A)-A$, to determine the right-side rotation $\hat{D}$ and the left-side rotation $\hat{G}$.

3. The method for dual harmonization of a DDP posture-detecting subsystem integrated into a worn/borne head-up viewing system according to claim 2, wherein and in a first configuration,
the number of erroneous or inexploitable degrees of angular freedom of the right-side bias rotation matrix $\hat{D}$ is equal to three and the number of erroneous or inexploitable degrees of angular freedom of the left-side bias rotation matrix $\hat{G}$ is equal to three, the first step carries out a number N higher than or equal to 3 of measurements, for which measurements the targeting actions Vi correspond to an alignment of displayed three-dimensional reference marks with observed exterior three-dimensional reference marks, and the second step of solving the system of dual harmonization equations comprises a first set of substeps consisting in:

in a first substep, choosing a "pivot" measurement as the first measurement among the N measurements, this pivot measurement corresponding to i equal to 1, and for i=2, ..., N the rotation matrices $\hat{U}_{1,i}$ and $\hat{K}_{1,i}$ are calculated using the equations: $\hat{U}_{1,i}=\hat{U}_1^T\cdot\hat{U}_i$ and $\hat{K}_{1,i}=\hat{K}_1^T\cdot\hat{K}_i$; then in a second substep, determining for i=2, ..., N the principle unit vectors of the rotations $\hat{U}_{1,i}$ and $\hat{K}_{1,i}$ and designated by $\vec{u}_i$ and $\vec{k}_i$, respectively; then in a third substep, calculating the right matrix $\hat{D}$ using the equation:

$$\hat{D} = \pi\left(\sum_{i>2}(\vec{k}_i\cdot\vec{u}_i^T)\right)$$

then in a fourth substep, determining the left-side rotation matrix $\hat{G}$ on the basis of the matrix $\hat{D}$ calculated in the third substep, using the equation:

$$\hat{G} = \pi\left(\sum_{i>1}(\hat{U}_i\cdot\hat{D}^T\cdot\hat{K}_i^T)\right).$$

4. A worn/borne head-up viewing system located on-board a carrier vehicle and comprising:
the transparent worn/borne head-up viewing device $D_v$,
the reference device $D_{ref}$ having a reference coordinate system $R_{ref}$ that is either a coordinate system of the carrier vehicle or a local geographic coordinate system or a terrestrial coordinate system;
the DDP posture-detecting subsystem comprising:
the tracking solid first element S1 tightly attached to the transparent worn/borne head-up viewing device $D_v$;
the fixed solid second element S2 tightly joined to the reference device $D_{ref}$; and
the dual harmonization subsystem for harmonizing the head-up viewing system and the DDP posture-detecting subsystem, the dual harmonization subsystem comprising a dual harmonization processor and an HMI interface for managing the acquisitions of the harmonization measurements,
the worn/borne head-up viewing system being wherein the dual harmonization subsystem and the DDP posture-detecting subsystem are configured to:
in a first step, carry out a series of a preset number N of measurements of relative orientations $\hat{K}_i$, i varying from 1 to N, of the tracking solid first element S1 with respect to the fixed solid second element S2 of the DDP posture-detecting subsystem, corresponding to different targeting actions Vi, i varying from 1 to N, in which measurements one or more different preset elements of pilot/driver information displayed in the transparent worn/borne head-up viewing device $D_v$ are superposed or aligned with one or more corresponding landmarks of the real outside world; then
in a second step, and using a dual harmonization algorithm, conjointly calculate the relative orientation matrix $\hat{R}(S1/v)$ of the tracking solid first element S1 of the posture-detecting subsystem with respect to the transparent worn/borne head-up viewing device $D_v$, and/or the relative orientation matrix $\hat{R}(ref/S2)$ of the external reference device $D_{ref}$ with respect to the fixed solid second element S2 of the posture-detecting subsystem to respectively be the right-side bias rotation matrix $\hat{D}$ and the left-side bias rotation matrix $\hat{G}$, which are conjoint solutions of the system of dual harmonization equations: $\hat{U}_i=\hat{G}\cdot\hat{K}_i\cdot\hat{D}$, i varying from 1 to N;
the minimum required number N of measurements depends on the number L of erroneous or inexploitable degrees of angular freedom of the rotation matrices $\hat{R}(S1/v)$ and $\hat{R}(ref/S2)$ of the head-up viewing system, said number L being an integer higher than or equal to 1 and lower than or equal to 6,
the solution of the system of equations $\hat{U}_i=\hat{G}\cdot\hat{K}_i\cdot\hat{D}$, i varying from 1 to N, uses a rectification operator $\pi(.)$ that converts any given matrix A into a 3×3 square rotation matrix $\pi(A)$, which matrix $\pi(A)$, of all the 3×3 rotation matrices, is the closest in the least-squares sense to all of the terms of the matrix $\pi(A)-A$, to determine the right-side rotation $\hat{D}$ and the left-side rotation $\hat{G}$; and
wherein the dual harmonization subsystem and the DDP posture-detecting subsystem are configured to implement the first and second steps such as defined in claim 3.

5. The method for dual harmonization of a DDP posture-detecting subsystem integrated into a worn/borne head-up viewing system according to claim 3, wherein and in a second configuration,
the number of erroneous or inexploitable degrees of angular freedom of the right-side bias rotation matrix $\hat{D}$ is equal to three and the single erroneous or inexploitable degree of angular freedom of the left-side bias rotation matrix $\hat{G}$ is the azimuth angle, the elevation and roll angles being assumed to be known with a sufficient precision; and
the first step carries out a number N higher than or equal to 4 of measurements, for which measurements the targeting actions Vi correspond to an alignment of displayed three-dimensional reference marks with observed three-dimensional reference marks, and
the second step of solving the system of dual harmonization equations comprises a second set of substeps consisting in:
in a fourth substep for i=2, ..., N, calculating the matrices $\hat{U}_{1,i}$ and the vectors $\vec{q}_i$ using the equations:

$\hat{U}_{1,i}=\hat{U}_1^T\cdot\hat{U}_i$ and $\vec{q}_i=\hat{Q}_1^T\cdot\hat{K}_i$, the vector $\vec{k}$ being defined by the equation $$\vec{k} = \begin{pmatrix} 0 \\ 0 \\ 1 \end{pmatrix};$$

then
  in an initialization fifth substep, initializing a first sequence of matrices $\{\hat{D}_{[s]}\}$, [s] designating the current integer rank of advancement through the sequence $\{\hat{D}_{[s]}\}$, by setting $\hat{D}_{[0]}$ equal to $I_3$, $I_3$ being the identity matrix; then
  repeating an iterative sixth substep in which iteration [s+1] is passed to from iteration [s] by calculating the vector value $\vec{d}_{[s+1]}$, then the value $\hat{D}_{[s+1]}$ of the first matrix sequence $\{\hat{D}_{[s]}\}$, using the following equations:

$$\vec{d}_{[s+1]} = \frac{\sum_{i\geq 2}(\hat{U}_{1,i} \cdot \hat{D}_{[s]}^T \cdot \vec{q}_i)}{\left\|\sum_{i\geq 2}(\hat{U}_{1,i} \cdot \hat{D}^T \cdot \vec{q}_i)\right\|}$$

$$\hat{D}_{[s+1]} = \pi\left(\sum_{i\geq 2}(\vec{q}_i \cdot \vec{d}_{[s+1]}^T \cdot \hat{U}_{1,i})\right)$$

the sequence $\{\vec{d}_{[s]}\}$ being an auxiliary second sequence of vectors and the sequence $\{\hat{D}_{[s]}\}$ converging to $\hat{D}$; and
  stopping in a seventh substep the iterative process carried out throughout the sixth substep when the limit $\hat{D}$ is approximated with a sufficient precision defined by a preset threshold value.

6. The method for dual harmonization of a DDP posture-detecting subsystem integrated into a worn/borne head-up viewing system according to claim 2, wherein and in a second configuration,
  the number of erroneous or inexploitable degrees of angular freedom of the right-side bias rotation matrix $\hat{D}$ is equal to three and the single erroneous or inexploitable degree of angular freedom of the left-side bias rotation matrix $\hat{G}$ is the azimuth angle, the elevation and roll angles being assumed to be known with a sufficient precision; and
  the first step carries out a number N higher than or equal to 4 of measurements, for which measurements the targeting actions Vi correspond to an alignment of displayed three-dimensional reference marks with observed three-dimensional reference marks, and
  the second step of solving the system of dual harmonization equations comprises a second set of substeps consisting in:
  in a fourth substep for i=2, ..., N, calculating the matrices $\hat{U}_{1,i}$ and the vectors $\vec{q}_i$ using the equations:

$$\hat{U}_{1,i} = \hat{U}_1^T \cdot \hat{U}_i \text{ and } \vec{q}_i = \hat{Q}_1^T \cdot \vec{k},$$

the vector $\vec{k}$ being defined by the equation $$\vec{k} = \begin{pmatrix} 0 \\ 0 \\ 1 \end{pmatrix};$$

then
  in an initialization fifth substep, initializing a first sequence of matrices $\{\hat{D}_{[s]}\}$, [s] designating the current integer rank of advancement through the sequence $\{\hat{D}_{[s]}\}$, by setting $\hat{D}_{[0]}$ equal to $I_3$, $I_3$ being the identity matrix; then
  repeating an iterative sixth substep in which iteration [s+1] is passed to from iteration [s] by calculating the vector value $\vec{d}_{[s+1]}$, then the value $\hat{D}_{[s+1]}$ of the first matrix sequence $\{\hat{D}_{[s]}\}$, using the following equations:

$$\vec{d}_{[s+1]} = \frac{\sum_{i\geq 2}(\hat{U}_{1,i} \cdot \hat{D}_{[s]}^T \cdot \vec{q}_i)}{\left\|\sum_{i\geq 2}(\hat{U}_{1,i} \cdot \hat{D}^T \cdot \vec{q}_i)\right\|}$$

$$\hat{D}_{[s+1]} = \pi\left(\sum_{i\geq 2}(\vec{q}_i \cdot \vec{d}_{[s+1]}^T \cdot \hat{U}_{1,i})\right)$$

the sequence $\{\vec{d}_{[s]}\}$ being an auxiliary second sequence of vectors and the sequence $\{\hat{D}_{[s]}\}$ converging to $\hat{D}$; and
  stopping in a seventh substep the iterative process carried out throughout the sixth substep when the limit $\hat{D}$ is approximated with a sufficient precision defined by a preset threshold value.

7. The method for dual harmonization of a DDP posture-detecting subsystem integrated into a worn/borne head-up viewing system according to claim 2, wherein and in a third configuration,
  the number of erroneous or inexploitable degrees of angular freedom of the right-side bias rotation matrix $\hat{D}$ is equal to three and the number of erroneous or inexploitable degrees of angular freedom of the left-side bias rotation matrix $\hat{G}$ is equal to three, and
  the first step carries out a number N higher than or equal to 4 of measurements, for which measurements the targeting actions Vi correspond to an alignment of a plurality of different targeting directions $\vec{x}_i$ with a plurality of targeted exterior directions $\vec{y}_i$ that are known in the reference exterior coordinate system $R_{ref}$, without roll adjustment, the vector families $\{\vec{x}_i\}$ and $\{\vec{y}_i\}$ both being free; and
  the second step of solving the system of dual harmonization equations: $\vec{y}_i = \hat{G} \cdot \hat{K}_i \cdot \hat{D} \cdot \vec{x}_i$ for i varying from 1 to N comprises a third set of the following substeps consisting in:
  in an initialization eighth substep, initializing a first sequence of left matrices $\{\hat{G}_{[s]}\}$, [s] designating the integer rank of advancement through this first sequence, by setting $\hat{G}_{[0]}$ equal to $I_3$, $I_3$ being the identity matrix; then
  repeating an iterative ninth substep in which iteration [s+1] is passed to from iteration [s] by calculating the matrix $\hat{D}_{[s+1]}$ then the matrix $\hat{G}_{[s+1]}$ using the following equations:

$$\hat{D}_{[s+1]} = \pi\left(\sum_{i\geq 1}(\hat{K}_i^T \cdot \hat{G}_{[s]}^T \cdot \vec{y}_i \cdot \vec{x}_i^T)\right)$$

$$\hat{G}_{[s+1]} = \pi\left(\sum_{i\geq 1}(\vec{y}_i \cdot \vec{x}_i^T \cdot \hat{D}_{[s+1]}^T \cdot \hat{K}_i^T)\right)$$

the sequence $\{\hat{D}_{[s]}\}$, being a second sequence of right matrices, and the sequences $\hat{D}_{[s]}$ and $\hat{G}_{[s]}$ converging to $\hat{D}$ and $\hat{G}$, respectively; and
  stopping in a stopping tenth substep the iterative process executed throughout the ninth substep when the limits $\hat{D}$ and $\hat{G}$ are approximated with a sufficient precision.

8. The method for dual harmonization of a DDP posture-detecting subsystem integrated into a worn/borne head-up viewing system according to claim 2, wherein and in a fourth configuration,
- the number of erroneous or inexploitable degrees of angular freedom of the right-side bias rotation matrix $\hat{D}$ is equal to three and the left-side bias rotation matrix $\hat{G}$ is assumed to be known, and
- the first step carries out a number N higher than or equal to 3 of measurements, for which measurements the targeting actions Vi correspond to an alignment of N different targeting directions $\vec{x}_i$ with one and the same targeted direction $\vec{y}_0$, which targeted direction is known in the reference exterior coordinate system $R_{ref}$, without roll adjustment, the vector family $\{\vec{x}_i\}$ being free; and
- the second step of solving the system of dual harmonization equations: $\hat{G} \cdot \hat{K}_i \cdot \hat{D} \cdot \vec{x}_i = \vec{y}_0$ for i varying from 1 to N determines the right bias rotation matrix $\hat{D}$ via the following equation:

$$\hat{D} = \pi\left(\sum_{i \geq 1} (\hat{K}_i^T \cdot \hat{G}^T \cdot \vec{y}_0 \cdot \vec{x}_i^T)\right).$$

9. The method for dual harmonization of a DDP posture-detecting subsystem integrated into a worn/borne head-up viewing system according to claim 2, wherein and in a fifth configuration,
- the number of erroneous or inexploitable degrees of angular freedom of the right-side bias rotation matrix $\hat{D}$ is equal to three and the left-side bias rotation matrix $\hat{G}$ is assumed to be known, and
- the first step carries out a number N higher than or equal to 4 of measurements, for which measurements the targeting actions Vi correspond to an alignment of N different targeting directions $\vec{x}_i$ with one and the same unknown targeted exterior direction $\vec{y}_0$, without roll adjustment, the vector family $\{\vec{x}_i\}$ being free; and
- the second step of solving the system of dual harmonization equations: $\hat{G} \cdot \hat{K}_i \cdot \hat{D} \cdot \vec{x}_i = \vec{y}_0$ for i varying from 1 to N comprises a fifth set of substeps consisting in:
- in an initialization eleventh substep, initializing a first sequence of right matrices $\{\hat{D}_{[s]}\}$, [s] designating the integer rank of advancement through the sequence $\{\hat{D}_{[s]}\}$, by setting $\hat{D}_{[0]}$ equal to $I_3$, $I_3$ being the identity matrix; then
- repeating an iterative twelfth substep in which iteration [s+1] is passed to from iteration [s] by calculating the vector $\vec{y}_{[s+1]}$ then the matrix $\hat{D}_{[s+1]}$ using the following equations:

$$\vec{y}_{[s+1]} = \frac{\sum_{i \geq 1} (\hat{G} \cdot \hat{K}_i \cdot \hat{D}_{[s]} \cdot \vec{x}_i)}{\|\sum_{i \geq 1} (\hat{G} \cdot \hat{K}_i \cdot \hat{D}_{[s]} \cdot \vec{x}_i)\|}$$

$$\hat{D}_{[s+1]} = \pi\left(\sum_{i \geq 1} (\hat{K}_i^T \cdot \hat{G}^T \cdot \vec{y}_{[s+1]} \cdot \vec{x}_i^T)\right)$$

the sequence $\{\vec{y}_{[s]}\}$ being a second sequence of external direction vectors, and the sequences $\{\vec{y}_{[s]}\}$ and $\{\hat{D}_{[s]}\}$ converging to $\vec{y}_0$ and $\hat{D}$, respectively; and stopping in a stopping thirteenth substep the iterative process carried out throughout the twelfth substep when the limits $\vec{y}_0$ and $\hat{D}$ are approximated with a sufficient precision defined by one or two preset threshold values.

10. The method for dual harmonization of a DDP posture-detecting subsystem integrated into a worn/borne head-up viewing system according to claim 2, wherein and in a sixth configuration,
- the number of erroneous or inexploitable degrees of angular freedom of the right-side bias rotation matrix $\hat{D}$ is equal to three and the left-side bias rotation matrix $\hat{G}$ is unknown and indeterminable, and
- the first step carries out a number N higher than or equal to 4 of measurements, for which measurements the targeting actions Vi correspond to an alignment of N different targeting directions $\vec{x}_i$ with one and the same unknown targeted exterior direction $\vec{y}_0$, without roll adjustment, the vector family $\{\vec{x}_i\}$ being free, and reduces the solution of the system of dual harmonization equations: $\hat{G} \cdot \hat{K}_i \cdot \hat{D} \cdot \vec{x}_i = \vec{y}_0$ for i varying from 1 to N to the solution of the reduced system of dual harmonization equations:

$\hat{K}_i \cdot \hat{D} \cdot \vec{x}_i = \vec{z}_0$ for $i$ varying from 1 to 4, noting
$\vec{z}_0 = \hat{G}^T \cdot \vec{y}_0$; and

- the second step of solving the reduced system of dual harmonization equations comprises a sixth set of substeps consisting in:
- in an initialization fourteenth substep, initializing a first sequence of right matrices $\{\hat{D}_{[s]}\}$, [s] designating the integer rank of advancement through the sequence $\{\hat{D}_{[s]}\}$, $\hat{D}_{[0]}$ being set equal to $I_3$, $I_3$ being the identity matrix; then
- repeating an iterative fifteenth substep in which iteration [s+1] is passed to from iteration [s] by calculating the vector $\vec{z}_{[s+1]}$ then the matrix of the first matrix sequence using the following equations:

$$\vec{z}_{[s+1]} = \frac{\sum_{i \geq 1} (\hat{K}_i \cdot \hat{D}_{[s]} \cdot \vec{x}_i)}{\|\sum_{i \geq 1} (\hat{K}_i \cdot \hat{D}_{[s]} \cdot \vec{x}_i)\|}$$

$$\hat{D}_{[s+1]} = \pi\left(\sum_{i \geq 1} (\hat{K}_i^T \cdot \vec{z}_{[s+1]} \cdot \vec{x}_i^T)\right)$$

the sequence $\{\vec{z}_{[s]}\}$ being a second auxiliary sequence of vectors and the sequence $\{\hat{D}_{[s]}\}$ converging to $\hat{D}$; and stopping in a stopping sixteenth substep the iterative process carried out throughout the fifteenth substep when the limit $\hat{D}$ is approximated with a sufficient precision defined by a preset threshold value.

11. The method for dual harmonization of a DDP posture-detecting subsystem integrated into a worn/borne head-up viewing system according to claim 2, wherein and in a seventh configuration,
- the number of erroneous or inexploitable degrees of angular freedom of the left-side bias rotation matrix $\hat{G}$ is equal to three and the right-side bias rotation matrix $\hat{D}$ is assumed to be known; and
- the first step carries out a number N higher than or equal to 3 of measurements, for which measurements the targeting actions Vi correspond to an alignment of one and the same known targeting direction $\vec{x}_0$ with N known targeted exterior directions $\vec{y}_i$, without roll adjustment, the vector family $\{\vec{y}_i\}$ being free, and the second step of solving the system of dual harmonization equations: $\hat{G}\cdot\hat{K}_i\cdot\hat{D}\cdot\vec{x}_0=\vec{y}_i$ for i varying from 1 to N determines the sought left rotation matrix $\hat{G}$ using the equation:

$$\hat{G} = \pi\left(\sum_{i\geq 1}(\vec{y}_i\cdot\vec{x}_0^T\cdot\hat{D}^T\cdot\hat{K}_i^T)\right).$$

12. The method for dual harmonization of a DDP posture-detecting subsystem integrated into a worn/borne head-up viewing system according to claim 2, wherein and in an eighth configuration, the number of erroneous or inexploitable degrees of angular freedom of the left-side bias rotation matrix $\hat{G}$ is equal to three and the right-side bias rotation matrix $\hat{D}$ is assumed to be known, and the first step carries out a number N higher than or equal to 4 of measurements, for which measurements the targeting actions Vi correspond to an alignment of one and the same unknown targeting direction $\vec{x}_0$ with N known targeted exterior directions $\vec{y}_i$, without roll adjustment, the vector family $\{\vec{y}_i\}$ being free; and the second step of solving the system of dual harmonization equations: $\hat{G}\cdot\hat{K}_i\cdot\hat{D}\cdot\vec{x}_0=\vec{y}_i$ for i varying from 1 to N comprises an eighth set of substeps consisting in:

in a seventeenth substep, initializing a first sequence of left matrices $\{\hat{G}_{[s]}\}$, [s] designating the integer rank of advancement through the sequence $\{\hat{G}_{[s]}\}$, $\hat{G}_{[0]}$ being initialized set equal to $I_3$, $I_3$ being the identity matrix; then repeating an iterative eighteenth substep in which iteration [s+1] is passed to from iteration [s] by calculating the vector $\vec{x}_{[s+1]}$ then the matrix $\hat{G}_{[s+1]}$ using the following equations:

$$\vec{x}_{[s+1]} = \frac{\sum_{i\geq 1}(\hat{D}^T\cdot\hat{K}_i^T\cdot\hat{G}_{[s]}^T\cdot\vec{y}_i)}{\left\|\sum_{i\geq 1}(\hat{D}^T\cdot\hat{K}_i^T\cdot\hat{G}_{[s]}^T\cdot\vec{y}_i)\right\|}$$

$$\hat{G}_{[s+1]} = \pi\left(\sum_{i\geq 1}(\vec{y}_i\cdot\vec{x}_{[s+1]}^T\cdot\hat{D}^T\cdot\hat{K}_i^T)\right)$$

the sequence $\{\vec{x}_{[s]}\}$ being a second sequence of sight direction vectors, the sequences $\hat{G}_{[s]}$ and $\vec{x}_{[s]}$ converging to $\hat{G}$ and $\vec{x}_0$, respectively; and in a stopping nineteenth substep stopping the iterative process carried out throughout the eighteenth substep when the limits $\hat{G}$ and optionally $\vec{x}_0$ are approximated with a sufficient precision defined by one or two preset threshold values.

13. The method for dual harmonization of a DDP posture-detecting subsystem integrated into a worn/borne head-up viewing system according to claim 1, wherein the worn/borne head-up viewing system is intended to be located on-board a carrier vehicle comprised in the set of all aircraft, aeroplanes, helicopters, motor vehicles and robots.

14. A worn/borne head-up viewing system located on-board a carrier vehicle and comprising:

a transparent worn/borne head-up viewing device $D_v$, a reference device $D_{ref}$ having a reference coordinate system $R_{ref}$, that is a coordinate system of the carrier vehicle or a local geographic coordinate system or a terrestrial coordinate system;

a DDP posture-detecting subsystem comprising:

a tracking solid first element S1 tightly attached to the transparent worn/borne head-up viewing device $D_v$; and a fixed solid second element S2 tightly joined to the reference device $D_{ref}$, wherein the DDP posture-detecting subsystem is configured to measure and determine a relative orientation $\hat{K}$ of the tracking solid first element S1 with respect to the fixed solid second element S2, a dual harmonization subsystem configured to harmonize the head-up viewing system and the DDP posture-detecting subsystem, the dual harmonization subsystem comprising a dual harmonization processor and an HMI interface for managing acquisitions of harmonization measurements, the worn/borne head-up viewing system being wherein the dual harmonization subsystem and the DDP posture-detecting subsystem are configured to:

in a first step, carry out a series of a preset number N of measurements of relative orientations $\hat{K}_i$, varying from 1 to N, of the tracking solid first element S1 with respect to the fixed solid second element S2 of the DDP posture-detecting subsystem, corresponding to different targeting actions Vi, i varying from 1 to N, in which measurements of one or more different preset elements of pilot/driver information displayed in the transparent worn/borne head-up viewing device $D_v$ are superposed or aligned with one or more corresponding landmarks of a real outside world; then in a second step, and using a dual harmonization algorithm, conjointly calculate a relative orientation matrix $\hat{R}(S1/v)$ of the tracking solid first element S1 of the DDP posture-detecting subsystem with respect to the transparent worn/borne head-up viewing device $D_v$, and/or a relative orientation matrix $\hat{R}(ref/S2)$ of the exterior reference device $D_{ref}$ with respect to the fixed solid second element S2 of the DDP posture-detecting subsystem to respectively be a right-side bias rotation matrix $\hat{D}$ and a left-side bias rotation matrix $\hat{G}$, which are conjoint solutions of the system of dual harmonization equations: $\hat{U}_i=\hat{G}\cdot\hat{K}_i\cdot\hat{D}$, i varying from 1 to N.

15. The worn/borne head-up viewing system located on-board a carrier vehicle according to claim 14, wherein the minimum required number N of measurements depends on the number L of erroneous or inexploitable degrees of angular freedom of the rotation matrices $\hat{R}(S1/v)$ and $\hat{R}(ref/S2)$ of the head-up viewing system, said number L being an integer higher than or equal to 1 and lower than or equal to 6, and the solution of the system of equations $\hat{U}_i=\hat{G}\cdot\hat{K}_i\cdot\hat{D}$, i varying from 1 to N, uses a rectification operator $\pi(.)$ that converts any given matrix A into a 3×3 square rotation matrix $\pi(A)$, which matrix $\pi(A)$, of all the 3×3 rotation matrices, is the closest in the least-squares sense to all of the terms of the matrix $\pi(A)-A$, to determine the right-side rotation $\hat{D}$ and the left-side rotation $\hat{G}$.

16. A carrier vehicle, comprised in the set of all aircraft, aeroplanes, helicopters, motor vehicles and robots, and in which is installed a worn/borne head-up viewing system defined according to claim 14.

\* \* \* \* \*